US008449379B2

(12) United States Patent
Rowe et al.

(10) Patent No.: US 8,449,379 B2
(45) Date of Patent: May 28, 2013

(54) WIDE AREA LOYALTY ACCESS THROUGH INDEPENDENT BONUS NETWORK

(75) Inventors: Richard Rowe, Las Vegas, NV (US); Ali Saffari, Reno, NV (US)

(73) Assignee: IGT, Reno, NV (US)

( * ) Notice: Subject to any disclaimer, the term of this patent is extended or adjusted under 35 U.S.C. 154(b) by 1084 days.

(21) Appl. No.: 11/449,985

(22) Filed: Jun. 8, 2006

(65) Prior Publication Data

US 2006/0247035 A1 Nov. 2, 2006

Related U.S. Application Data

(63) Continuation-in-part of application No. 10/923,333, filed on Aug. 20, 2004.

(51) Int. Cl.
*A63F 13/00* (2006.01)

(52) U.S. Cl.
USPC ........................................................ 463/25

(58) Field of Classification Search
USPC .............................. 463/16–20, 25, 29, 40–42
See application file for complete search history.

(56) References Cited

U.S. PATENT DOCUMENTS

| | | | |
|---|---|---|---|
| 5,380,008 | A | 1/1995 | Mathis et al. |
| 5,401,024 | A | 3/1995 | Simunek |
| 5,651,548 | A | 7/1997 | French et al. |
| 5,655,961 | A | 8/1997 | Acres et al. |
| 5,735,742 | A | 4/1998 | French |
| 5,761,647 | A | 6/1998 | Boushy |
| 5,766,076 | A | 6/1998 | Pease et al. |
| 5,781,647 | A | 7/1998 | Fishbine et al. |

(Continued)

FOREIGN PATENT DOCUMENTS

| | | | |
|---|---|---|---|
| EP | 1380998 | A1 | 1/2004 |
| WO | WO97/44750 | | 11/1997 |
| WO | WO 2006/023681 | | 3/2006 |
| WO | WO 2007/145999 | A2 | 12/2007 |

OTHER PUBLICATIONS

International Search Report dated Dec. 22, 2005 mailed Jan. 12, 2006, from corresponding International Application No. PCT/US2005/029465, 4 pp.

(Continued)

*Primary Examiner* — David L Lewis
*Assistant Examiner* — Eric M Thomas
(74) *Attorney, Agent, or Firm* — Weaver Austin Villeneuve & Sampson LLP

(57) ABSTRACT

Disclosed are methods, apparatus, and systems, including computer program products, implementing and using techniques for providing wide area bonusing over a gaming network from a gaming machine provider. Player identification information associated with a player is received. Gaming machine data is also retrieved. The gaming machine data is associated with the player identification information, and includes information particular to one or more gaming machines played by the player. One or more criteria are applied to the retrieved gaming machine data. A player bonus is issued according to the application of the one or more criteria to the retrieved gaming machine data. The gaming machine data can identify a brand of gaming machines played by the player. The gaming machine data can also include data selected from the group consisting of total number of machines played, gaming machine play history, games played, number of plays per machine, number of plays per game, amounts wagered per machine, amounts wagered per game, and gaming machine location. The gaming machine data can be stored on a portable device carried by the player.

40 Claims, 12 Drawing Sheets

U.S. PATENT DOCUMENTS

| | | | | |
|---|---|---|---|---|
| 6,033,307 | A | 3/2000 | Vancura | |
| 6,080,062 | A | 6/2000 | Olson | |
| 6,193,607 | B1 | 2/2001 | Kay | |
| 6,217,448 | B1 | 4/2001 | Olsen | |
| 6,264,561 | B1 | 7/2001 | Saffari et al. | |
| 6,302,793 | B1 | 10/2001 | Fertitta, III et al. | 463/25 |
| 6,313,871 | B1 | 11/2001 | Schubert | |
| 6,358,149 | B1 | 3/2002 | Schneider et al. | |
| 6,409,595 | B1 | 6/2002 | Uihlein et al. | |
| 6,532,297 | B1 | 3/2003 | Lindquist | |
| 6,592,458 | B1 | 7/2003 | Ho | |
| 6,645,077 | B2 | 11/2003 | Rowe | |
| 6,663,490 | B2 | 12/2003 | Soltys et al. | |
| 6,682,423 | B2 | 1/2004 | Brosnan et al. | |
| 6,685,567 | B2 | 2/2004 | Cockerille et al. | |
| 6,804,763 | B1 | 10/2004 | Stockdale et al. | |
| 6,857,959 | B1 | 2/2005 | Nguyen | |
| 6,863,608 | B1 | 3/2005 | LeMay et al. | |
| 6,866,586 | B2 | 3/2005 | Oberberger et al. | |
| 7,111,141 | B2 | 9/2006 | Nelson | |
| 7,127,069 | B2 | 10/2006 | Nguyen | |
| 7,384,339 | B2 | 6/2008 | LeMay et al. | |
| 7,455,591 | B2 | 11/2008 | Nguyen | |
| 7,997,981 | B2 | 8/2011 | Rowe et al. | |
| 2001/0038178 | A1 | 11/2001 | Vancura | |
| 2002/0143626 | A1 | 10/2002 | Voltmer et al. | |
| 2003/0092484 | A1 | 5/2003 | Schneider et al. | 463/25 |
| 2003/0104860 | A1* | 6/2003 | Cannon et al. | 463/25 |
| 2003/0148808 | A1 | 8/2003 | Price | |
| 2003/0162591 | A1* | 8/2003 | Nguyen et al. | 463/29 |
| 2003/0211883 | A1* | 11/2003 | Potts | 463/25 |
| 2004/0142740 | A1 | 7/2004 | Damico et al. | |
| 2004/0152511 | A1 | 8/2004 | Nicely et al. | |
| 2004/0166923 | A1 | 8/2004 | Michaelson et al. | |
| 2005/0020354 | A1* | 1/2005 | Nguyen et al. | 463/25 |
| 2005/0054438 | A1* | 3/2005 | Rothschild et al. | 463/29 |
| 2006/0040736 | A1 | 2/2006 | Baerlocher et al. | |
| 2006/0040743 | A1 | 2/2006 | Saffari et al. | |
| 2006/0100008 | A1 | 5/2006 | Wright et al. | |

OTHER PUBLICATIONS

Written Opinion of the International Searching Authority mailed Jan. 12, 2006, from corresponding International Application No. PCT/US2005/029465, 6 pp.

U.S. Appl. No. 11/224,903, filed Sep. 12, 2005.

U.S. Appl. No. 11/225,299, filed Sep. 12, 2005.

International Search Report and Written Opinion dated Dec. 13, 2007 for PCT/US2007/013325.

Communication Pursuant to Article 94(3) EPC dated Oct. 5, 2009 in 07809360.6.

International Report on Patentability and Written Report dated Dec. 10, 2008 in PCT/U52007/013325.

Chinese Office Action dated Jun. 12, 2010, Serial No. 200780027102.0.

U.S. Appl. No. 09/642,192, filed Aug. 18, 2000, LeMay et al.

US Office Action dated Apr. 2, 2008 issued in U.S. Appl. No. 10/923,333.

US Office Action Final dated Oct. 21, 2008 issued in U.S. Appl. No. 10/923,333.

US Office Action dated Apr. 27, 2009 issued in U.S. Appl. No. 10/923,333.

US Office Action Final dated Nov. 20, 2009 issued in U.S. Appl. No. 10/923,333.

US Office Action dated Jul. 14, 2010 issued in U.S. Appl. No. 10/923,333.

US Office Action Final dated Dec. 17, 2010 issued in U.S. Appl. No. 10/923,333.

US Notice of Panel Decision from Pre-Appeal Brief Review dated Apr. 27, 2011 issued in U.S. Appl. No. 10/923,333.

US Office Action dated Jul. 8, 2011 issued in U.S. Appl. No. 10/923,333.

US Office Action Final dated Jan. 20, 2012 issued in U.S. Appl. No. 10/923,333.

PCT International Preliminary Report on Patentability and Written Opinion dated Feb. 20, 2007 issued in PCT/US2005/029465 (WO2006/23681).

Australian Examiner's first report dated Jun. 27, 2011 issued in AU 2007258661.

Australian Examiner's report No. 2 dated May 8, 2012 issued in AU 2007258661.

Chinese First Office Action dated Jun. 12, 2010 issued in CN 200780027102.0.

Chinese Second Office Action dated Mar. 10, 2011 issued in CN 200780027102.0.

Wang et al., "Casino Technology: Player Tracking and Slot Accounting Systems", (Abstract) *UNLV Gaming Research & Review Journal*, Univ. Nevada, 6(1):43-56.

* cited by examiner

WIDE AREA LOYALTY ACCESS THROUGH INDEPENDENT BONUS NETWORK

REFERENCE TO EARLIER-FILED APPLICATION

This application claims priority and is a continuation-in-part of co-pending and commonly assigned U.S. patent application Ser. No. 10/923,333, by Saffari et al., filed Aug. 20, 2004, for WIDE AREA BONUSING SYSTEMS, which is hereby incorporated by reference.

FIELD OF THE INVENTION

The present invention relates to gaming machines, such as slot machines and video poker machines, and gaming networks. More particularly, the present invention relates to methods and devices for monitoring gaming machine usage and awarding bonuses to players of the gaming machines.

BACKGROUND OF THE INVENTION

Gaming in the United States is divided into Class I, Class II and Class III games. Class I gaming includes social games played for minimal prizes, or traditional ceremonial games. Class II gaming includes bingo games, pull tab games if played in the same location as bingo games, lotto, punch boards, tip jars, instant bingo, and other games similar to bingo. Class III gaming includes any game that is not a Class I or Class II game, such as a game of chance typically offered in non-Indian, state-regulated casinos. Many games of chance that are played on gaming machines fall into the Class II and Class III categories of games.

As technology in the gaming industry progresses, the traditional mechanically driven reel slot machines are being replaced with electronic counterparts, that is, electronic gaming machines having video displays based on CRT, LCD or the like. Electronic gaming machines such as video slot machines and video poker machines are becoming increasingly popular. Part of the reason for their increased popularity is the nearly endless variety of games that can be implemented on a single gaming machine. Advancements in video/electronic gaming enable the operation of more complex games that would not otherwise be possible on mechanical-driven gaming machines or personal computers.

Various games, particularly the Class II and Class III categories of games, can be implemented as server-based games in a server-client system. In a server-based gaming arrangement, a gaming server serves multiple gaming machines as clients. For example, a casino can include a plurality of gaming machines located on the game floor, and a connected gaming server located in a back room of the casino. Generally, the games and capabilities of a gaming machine depend on the central server. The gaming machine may download games from the central server or may rely on the central server to run the games.

To enhance the gaming experience, there are devices that can be connected to a gaming machine such as a slot machine or video poker machine. Examples of these devices include player tracking units, lights, ticket printers, card readers, speakers, bill validators, ticket readers, coin acceptors, display panels, key pads, coin hoppers and button pads. These devices are built into the gaming machine or components attached to the gaming machine, for instance, a top box which is constructed on top of the gaming machine.

Typically, using a master gaming controller, a gaming machine controls various combinations of devices that allow a player to play a game on the gaming machine and also encourage game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play.

After game play has been initiated, the gaming machine determines a game outcome, presents the game outcome to the player and may dispense an award of some type depending on the outcome of the game. A game outcome presentation may utilize many different visual and audio components such as flashing lights, music, sounds and graphics. The visual and audio components of the game outcome presentation may be used to draw a player's attention to various game features and to heighten the player's interest in additional game play.

Maintaining a game player's interest in game play, such as on a gaming machine or during other gaming activities, is an important consideration for an operator of a gaming establishment. As technology in the gaming industry progresses, more and more gaming services are being provided to gaming machines to maintain player interest. These services can be offered via communication networks that link groups of gaming machines to a remote computer, such as a host server, that provides one or more gaming services. As an example, gaming services that may be provided by a remote computer to a gaming machine via a communication network of some type include player tracking, accounting, cashless award ticketing, lottery, progressive games, and bonus games or prizes. These services and features are provided in addition to the games that are available for play on the gaming machines.

Player tracking programs are often offered by a particular gaming establishment to provide rewards to players that typically correspond to the player's level of patronage, for example, to the player's playing frequency and/or total amount of game plays at the particular gaming establishment. Player tracking rewards may be free meals, free lodging and/or free entertainment. These rewards may help to sustain a game player's interest in additional game play during a visit to a gaming establishment and may entice a player to visit a gaming establishment to partake in various gaming activities.

Bonusing systems have proven to be popular with players of gaming machines and to increase levels of play, particularly when the bonus prize pool becomes large. Like player tracking programs, bonusing systems have only been implemented by gaming establishments at specific gaming venues, such as a casino. Therefore, the bonus pool can only grow as fast as contributions at that site will permit. Moreover, bonusing systems are typically implemented as part of a player tracking or accounting system operated by the gaming establishment at which the bonusing system is implemented. Conventional techniques for adding bonusing features to a set of gaming machines require that the player tracking or accounting system be upgraded. In addition, owners of gaming establishments do not want to share player tracking information, so linking bonusing systems between gaming establishments would be problematic.

While gaming establishment operators have offered services such as player tracking programs and bonusing systems to further their economic interests, gaming machine providers have their own interests separate and apart from the gaming establishment. Gaming machine providers can refer to gaming machine manufacturers, suppliers, and distributors, and essentially any party involved in the making, selling, and distribution of gaming machines to casinos and other gaming establishments. On a fundamental level, a gaming machine provider is generally interested in: 1) encouraging game play on machines provided by that provider, and 2) monitoring the usage of gaming machines provided by that provider. The gaming machine provider has these same interests regardless of which casino(s) the player visits, and how much time the player spends in a given casino. Apart from the success of a particular gaming establishment, the gaming machine provider wants to increase the current profitability of games and machines it provides, and gather data as to the types of games, machines, and locations of those machines providing the greatest revenue, to increase future profitability by making better business decisions based on the gathered data.

It would be desirable to provide novel bonusing and other player loyalty systems that offer economic benefits to gaming machine providers, as well as the casino operators.

SUMMARY OF THE INVENTION

Disclosed are methods, apparatus, and systems, including computer program products, implementing and using techniques for providing wide area bonusing over a gaming network from a gaming machine provider.

According to one aspect of the present invention, player identification information associated with a player is received. Gaming machine data is also retrieved. The gaming machine data is associated with the player identification information, and includes information particular to one or more gaming machines played by the player. One or more criteria are applied to the retrieved gaming machine data. A player bonus is issued according to the application of the one or more criteria to the retrieved gaming machine data.

According to one aspect of the present invention, the gaming machine data identifies a brand of gaming machines played by the player. The gaming machine data can also include data selected from the group consisting of total number of machines played, gaming machine play history, games played, number of plays per machine, number of plays per game, amounts wagered per machine, amounts wagered per game, and gaming machine location.

According to one aspect of the present invention, the gaming machine data can be stored on a portable device carried by the player. In one implementation, the portable device is in constant communication with the gaming network during a gaming session. In another implementation, the portable device is configured to establish a first communications session with the gaming network at a beginning of a gaming session, establish a second communications session with the gaming network at an end of the gaming session, and disable communications with the gaming network between the first communications session and the second communications session. The portable device can provide the gaming data during the first communications session or the second communications session.

The present invention provides a novel bonusing system implemented on gaming machines and associated network devices on a network. Some aspects of the present invention are implemented, in part, using wide area progressive systems developed by the present assignee. Some implementations of the invention provide a method for providing wide area bonusing on a gaming network.

Some implementations of the invention provide a network device for implementing a wide area bonusing system. The network device includes an interface for communicating with a plurality of site controllers via a network, each site controller configured for communication with gaming machines.

Other implementations of the invention provide a network device for providing bonusing and progressive jackpots. The network device includes an interface for communicating with a plurality of site controllers located in a first plurality of gaming establishments.

All of the foregoing methods and apparatus, along with other methods and apparatus of aspects of the present invention, may be implemented in software, firmware, hardware and combinations thereof. For example, the methods of aspects of the present invention may be implemented by computer programs embodied in machine-readable media and other products.

Aspects of the invention may be implemented by networked gaming machines, game servers and other such devices. These and other features and benefits of aspects of the invention will be described in more detail below with reference to the associated drawings.

BRIEF DESCRIPTION OF THE DRAWINGS

The invention may best be understood by reference to the following description taken in conjunction with the accompanying drawings, which are illustrative of specific embodiments of the present invention.

DESCRIPTION OF THE PREFERRED EMBODIMENTS

Figure 1:
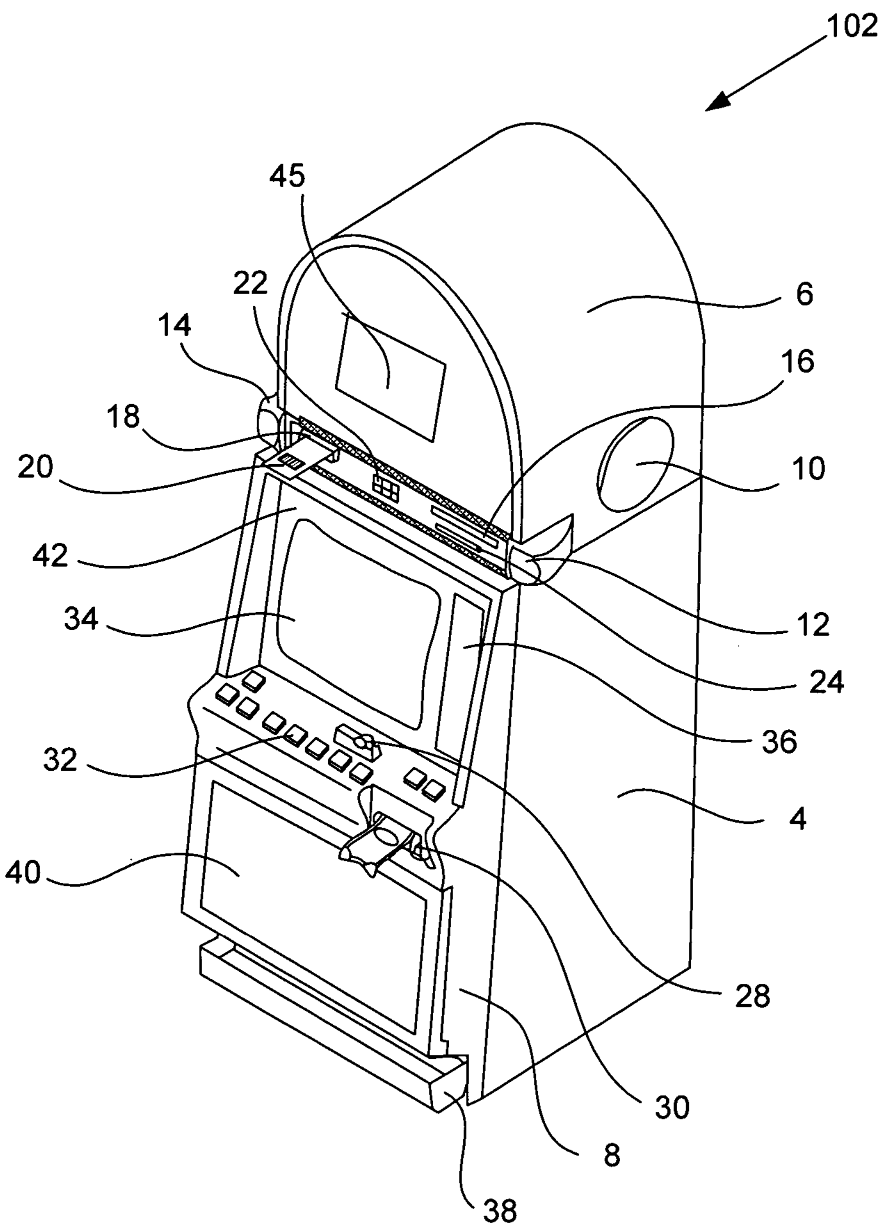
FIG. 1 is a diagram of a gaming machine constructed according to one embodiment of the present invention.

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. Moreover, numerous specific details are set forth below in order to provide a thorough understanding of the present invention. The present invention may be practiced without some or all of these specific details. In other instances, well known process operations have not been described in detail in order not to obscure the present invention.

Embodiments of the present invention interject loyalty programs and various promotions into wide area networks, such as Megajackpot networks. Embodiments of the invention enable direct access through a secondary bonusing network to provide direct access to players. Gaming machine providers can develop their own loyalty following, separate and apart from conventional bonusing and promotion schemes offered by a gaming establishment such as a casino. For the gaming machine provider to access the player, an independent network associated with the gaming machine provider is enhanced to include bonusing and loyalty type promotions.

In one implementation, a user interface on a display serves as an interface to the player. In another implementation, a secondary card reader is operable to read magnetic stripe cards or smart cards received from the player and communicate player identification and gaming machine information to a backend system. This gathering and transmission of gaming machine data preferably occurs on a network device such as a server de-coupled from data processing devices operated by the casino. In one embodiment, the network device is coupled to a secondary network independent from a gaming establishment network such as an accounting or player tracking network established within the casino. The secondary network can enable bonusing and promotions over a wide area to enable various games, e.g. progressive games, to participate in the promotion offered by the gaming machine provider.

Embodiments of the present invention are generally directed to methods and devices for implementing bonus prize winning modes, referred to herein as "bonusing systems." A bonusing system may award a bonus prize in addition to, and independently of, the prizes available due to a game outcome. A bonusing system normally includes a bank of gaming machines in a particular gaming establishment, such as an individual casino. Each gaming machine has an interface that provides communication between the gaming machine and a central network device, such as a server. The server receives information from each gaming machine regarding, e.g., an indication of play, a wager value, etc. The server determines a bonus prize pool that accumulates as the gaming machines are played. The accumulated bonus prize pool may be displayed on the participating gaming machines. The bonus prize pool continues to accumulate until there is a bonus prize award to a particular gaming machine.

Embodiments of the present invention generally provide a wide area bonusing system implemented on gaming machines and associated network devices on a network. In some implementations, individual sites may elect to participate in the wide area bonusing system and contribute to a wide area bonus pool. According to some implementations, sites and/or types of gaming devices are qualified for, or eliminated from, participation based on various criteria. These criteria may include, but are not limited to, contribution level, games available, date range, location, device manufacturer and denominations available. In some implementations, the qualification or elimination process is performed at a site (e.g., by a site controller) according to criteria obtained from a central system. In alternative implementations, the qualification or elimination process is performed by the central system.

Some implementations of the present invention use a modified version of preexisting progressive jackpot gaming networks to implement bonusing systems of the present invention. The bonusing and progressive jackpot features may apply to the same gaming machines or to different gaming machines on the same gaming network. For example, within a group of gaming machines in a particular gaming establishment, some may participate in a progressive jackpot, some may participate in bonusing and some may participate in both. The bonusing and progressive jackpot features may be implemented in a single gaming establishment or in multiple gaming establishments.

Turning first to FIG. 1, a video gaming machine 2 constructed according to one embodiment of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. a master gaming controller) housed inside the main cabinet 4 of the machine 2.

In FIG. 1, the information panel 36 may be used as an interface to provide player tracking services and other game services to a player playing a game on the gaming machine 2. The information panel 36 may be used as an interface by a player to: 1) input player tracking identification information, 2) view account information and perform account transactions for accounts such as player tracking accounts and bank accounts, 3) receive operating instructions, 4) redeem prizes or comps including using player tracking points to redeem the prize or comp, 5) make entertainment service reservations, 6) transfer credits to cashless instruments and other player accounts, 7) participate in casino promotions, 8) select entertainment choices for output via video and audio output mechanisms, 9) play games and bonus games, 10) request gaming services such as a drink orders, 11) communicate with other players or casino service personnel and 12) register a player for a loyalty program such as a player tracking program. In addition, the information panel 36 may be used as an interface by casino service personnel to: a) access diagnostic menus, b) display player tracking unit status information and gaming machine status information, c) access gaming machine metering information and d) display player status information.

Many different types of games, including mechanical slot games, video slot games, video poker, video black jack, video pachinko and lottery, may be provided on gaming machine 2. The gaming machine 2 is operable to provide play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may execute game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

In FIG. 1, the gaming machine 2 includes a top box 6 which sits on top of the main cabinet 4. The top box 6 houses a number of devices which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. The top box 6 may house various devices. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming devices on which the present invention may be implemented. For example, not all suitable gaming machines have top boxes or player tracking features. Further, some gaming machines have only a single game display—mechanical or video—while others are designed for bar tables and have displays that face upwards. As another example, a game may be generated on a host computer and may be displayed on a remote terminal or a remote gaming device. The remote gaming device may be connected to the host computer via a network of some type such as a local area network, a wide area network, an intranet or the Internet, by a wired or wireless connection. The remote gaming device may be a portable gaming device such as but not limited to a cell phone, a personal digital assistant, and a wireless game player. Images rendered from 3-D gaming environments may be displayed on portable gaming devices that are used to play a game of chance. Further, a gaming machine or server may include gaming logic for commanding a remote gaming device to render an image from a virtual camera in a 3-D gaming environment stored on the remote gaming device and to display the rendered image on a display located on the remote gaming device. Thus, those of skill in the art will understand that the present invention, as described below, can be deployed on most any gaming machine now available or hereafter developed.

Some preferred IGT gaming machines are implemented with special features and/or additional circuitry that differentiates them from general-purpose computers (e.g., desktop personal computers and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements, and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. This requirement affects the software and hardware design on a gaming machine. As anyone who has used a PC knows, PCs are not state machines and a majority of data is usually lost when such a malfunction occurs.

A second important difference between gaming machines and common PC based computer systems is that for regulation purposes, the software on the gaming machine used to generate the game of chance and operate the gaming machine has been designed to be static and monolithic to prevent cheating by the operator of the gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burned, approved by the gaming jurisdiction and installed on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and in some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally, in the gaming industry, gaming machines have been relatively simple in the sense that the number of peripheral devices and the number of functions of the gaming machine have been limited. Further, in operation, the functionality of gaming machines were relatively constant once the gaming machine was deployed, i.e., new peripherals devices and new gaming software were infrequently added to the gaming machine. This differs from a PC where users will buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators, ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in IGT gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the gaming machine circuitry. These can be generated in a central power supply or locally on the circuit board. If any of these voltages falls out of the tolerance limits of the circuitry they power, unpredictable operation of the gaming machine may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines typically have power supplies with tighter voltage margins than that required by the operating circuitry. In addition, the voltage monitoring circuitry implemented in IGT gaming machines typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This ensures the player's wager and credits are preserved and minimizes potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at just prior to the malfunction including an indication of selections that have already been made by the player. In general, the gaming machine may be restored to any state in a plurality of states that occur in the game of chance while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," all of which are hereby incorporated by reference for all purposes.

Another feature of gaming machines, such as IGT gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents in a separate third party verification device. Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. Some details related to trusted memory devices that may be used in the present invention are described in U.S. Pat. No. 6,685,567 from U.S. patent application Ser. No. 09/925,098, filed Aug. 8, 2001 and titled "Process Verification," which is hereby incorporated by reference in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the information panel 36 and video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one or more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

When a gaming platform is capable of providing multiple games to a game player based upon a game selection made by the player or an operator, it may be desirable from both an operator perspective and a content provider perspective to provide capabilities for allowing more complex game licensing methods. The operator and content provider may use the licensing capabilities to enter into licensing agreements that better reflect the value of the content (e.g., game software) to each party. For instance, the licensing parties may agree to utility model based licensing schemes, such as a pay-per-use scheme. In a pay-per-use scheme, operators only pay for game software that is utilized by their patrons, protecting them from software titles that are "duds."

Game platforms exist that provide access to multiple electronic games. On these devices, a game selection menu may be provided on a video display, which offers the patron the choice of at least two electronic games. A game player may select a game of their choice from the games available on the gaming machine. Typically, the choices of games available to the player are only those licensed for play on the gaming platform. The gaming platform may provide a manual mechanism, such as a display interface on the gaming machine, for updating and renewing licensing on the gaming machine.

In some game platforms offering multiple games, the games are stored on read-only memory devices, such as an EPROM chip set or a CD-ROM. To provide a new or a different game on a gaming platform of this type, a technician, usually accompanied by a gaming regulator, must manually install a new memory device (e.g. EPROM) and then manually update the licensing configuration on the gaming machine. The gaming regulator then places evidence tape across the EPROM. The evidence tape is used to detect tampering between visits by the gaming regulator. Since operations performed by entities other than a "trusted" 3$^{rd}$ party, such as a gaming regulator, have been deemed untrustworthy, automatic game downloads and automatic licensing management is not available on these platforms.

The licensing of multiple games on a gaming machine is described in U.S. Pat. No. 6,264,561, titled "Electronic Gaming Licensing Apparatus and Method," assigned to IGT (Reno, Nev.), which is incorporated herein by reference in its entirety and for all purposes.

Figure 2:
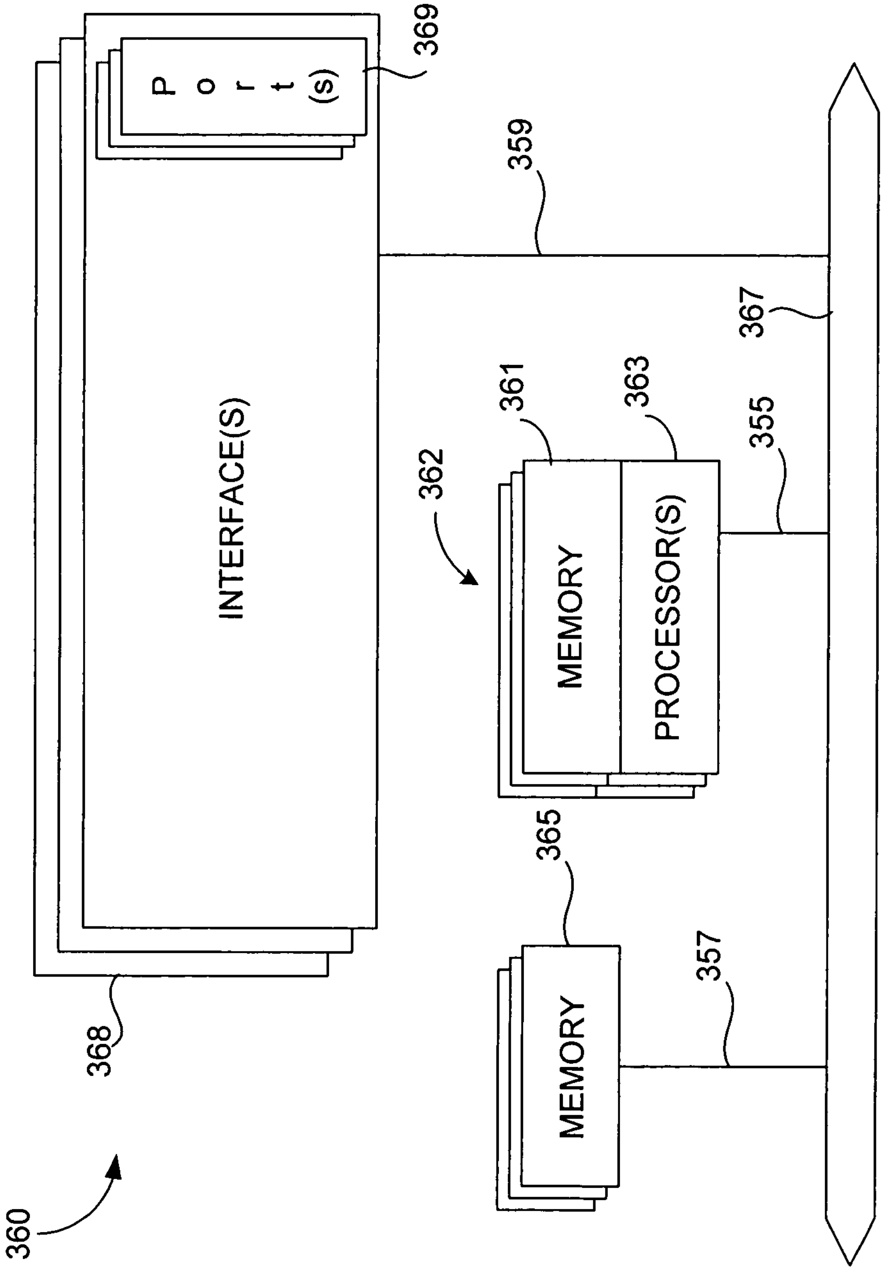
FIG. 2 is a block diagram of a network device that can be configured as a server or other data processing apparatus for implementing embodiments of the present invention.

FIG. 2 illustrates an example of a network device that may be configured as a server for implementing some methods and apparatus of the present invention. Network device 360 includes a master central processing unit (CPU) 362, interfaces 368, and a bus 367 (e.g., a PCI bus). Generally, interfaces 368 include ports 369 appropriate for communication with the appropriate media. In some embodiments, one or more of interfaces 368 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 368 control such communications-intensive tasks as media control and management. By providing separate processors for the communications-intensive tasks, interfaces 368 allow the master microprocessor 362 efficiently to perform other functions such as routing computations, network diagnostics, security functions, etc.

The interfaces 368 are typically provided as interface cards (sometimes referred to as "linecards"). Generally, interfaces 368 control the sending and receiving of data packets over the network and sometimes support other peripherals used with the network device 360. Among the interfaces that may be provided are FC interfaces, Ethernet interfaces, frame relay interfaces, cable interfaces, DSL interfaces, token ring interfaces, and the like. In addition, various high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 362 may be responsible for implementing specific functions associated with the functions of a desired network device. According to some embodiments, CPU 362 accomplishes all these functions under the control of software including an operating system and any appropriate applications software.

CPU 362 may include one or more processors 363 such as a processor from the Motorola family of microprocessors or the MIPS family of microprocessors. In an alternative embodiment, processor 363 is specially designed hardware for controlling the operations of network device 360. In a specific embodiment, a memory 361 (such as non-volatile RAM and/or ROM) also forms part of CPU 362. However, there are many different ways in which memory could be coupled to the system. Memory block 361 may be used for a variety of purposes such as, for example, caching and/or storing data, programming instructions, etc.

Regardless of the network device's configuration, it may employ one or more memories or memory modules (such as, for example, memory block 365) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 2 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 2) or switch fabric based (such as a cross-bar).

Figure 3:
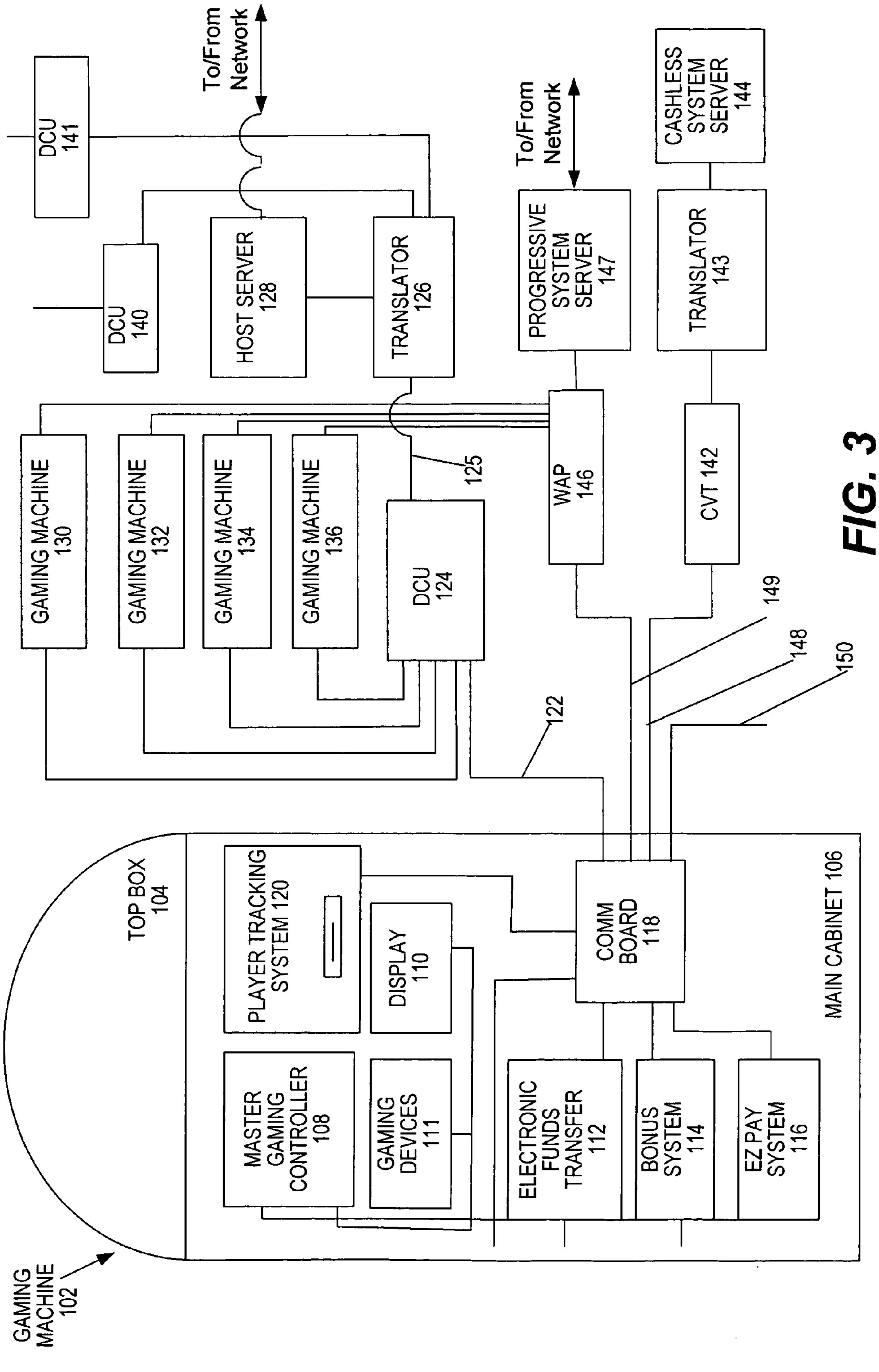
FIG. 3 is a block diagram depicting a network of gaming machines and other devices within a gaming establishment.

FIG. 3 is a simplified block diagram depicting gaming machines within a gaming establishment 101. The gaming machines are connected with a dedicated communication network via a host server 128 and a data collection unit (DCU) according to one embodiment of the invention. According to some embodiments of the invention, the DCU is an enhanced DCU as described in U.S. patent application Ser. No. 10/187,059, entitled "Redundant Gaming Network Mediation," which is hereby incorporated by reference in its entirety.

In FIG. 3, gaming machine 102, and the other gaming machines 130, 132, 134, and 136, include a main cabinet 106 and a top box 104. The main cabinet 106 houses the main gaming elements and can also house peripheral systems, such as those that utilize dedicated gaming networks. The top box 104 may also be used to house these peripheral systems.

The master gaming controller 108 controls the game play on the gaming machine 102 and receives or sends data to various input/output devices 111 on the gaming machine 102. The master gaming controller 108 may also communicate with a display 110.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 108 may also communicate with EFT system 112, bonus system 114, EZPay™ system 116 (a proprietary cashless ticketing system of the present assignee), and player tracking system 120. The systems of the gaming machine 102 communicate the data onto the network 122 via a communication board 118.

In general, the dedicated communication network is not accessible to the public. Due to the sensitive nature of much of the information on the dedicated networks, for example, electronic fund transfers and player tracking data, usually the manufacturer of a host system, such as a player tracking system, or group of host systems, employs a particular networking language having proprietary protocols. For instance, 10-20 different companies produce player tracking host systems where each host system may use different protocols. These proprietary protocols are usually considered highly confidential and not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino. Examples of protocol mediation to address these issues may be found, for example, in U.S. Pat. No. 6,682,423, "Open Architecture Communications in a Gaming Network," which is hereby incorporated by reference in its entirety.

Further, in the gaming industry, gaming machines are made by many different manufacturers. The communication protocols on the gaming machine are typically hard-coded into the gaming machine software, and each gaming machine manufacturer may utilize a different proprietary communication protocol. A gaming machine manufacturer may also produce host systems, in which case their gaming machines are compatible with their own host systems. However, in a heterogeneous gaming environment, such as a casino, gaming machines from many different manufacturers, each with their own communication protocol, may be connected to host systems from many different manufacturers, each with their own communication protocol. Therefore, communication compatibility issues regarding the protocols used by the gaming machines in the system and protocols used by the host systems must be considered.

In the present illustration, the gaming machines, 102, 130, 132, 134, and 136 are connected to a dedicated gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCUs, such as 124, 140 and 141.

Further, in some dedicated gaming networks, the DCU 124 can receive data transmitted from the host server 128 for communication to the gaming machines on the gaming network. The received data may be communicated synchronously to the gaming machines on the gaming network. Within a gaming establishment, the gaming machines 102, 130, 132, 134 and 136 are located on the gaming floor for player access while the host server 128 is usually located in another part of gaming establishment 101 (e.g. the backroom), or at another location.

In a gaming network, gaming machines, such as 102, 130, 132, 134 and 136, may be connected through multiple communication paths to a number of gaming devices that provide gaming services. For example, gaming machine 102 is connected to four communication paths, 122, 148, 149 and 150. As described above, communication path 122 allows the gaming machine 102 to send information to host server 128. Via communication path 148, the gaming machine 102 is connected to a clerk validation terminal 142. The clerk validation terminal 142 is connected to a translator 143 and a cashless system server 144 that are used to provide cashless gaming services to the gaming machine 102. Gaming machines 130, 132, 134 and 136 may also be connected to the clerk validation terminal 142 and may also receive cashless system services.

Via communication path 149, the gaming machine 102 is connected to a wide area progressive (WAP) device 146. The WAP is connected to a progressive system server 147 that may be used to provide progressive gaming services to the gaming machines. The progressive game services enabled by the progressive game network increase the game playing capabilities of a particular gaming machine by enabling a larger jackpot than would be possible if the gaming machine was operating in a “stand alone” mode. Playing a game on a participating gaming machine gives a player a chance to win the progressive jackpot. The potential size of the jackpot increases as the number of gaming machines connected in the progressive network is increased. The size of the jackpot tends to increase game play on gaming machines offering a progressive jackpot.

Gaming machines 130, 132, 134 and 136 are connected to WAP device 146 and progressive system server 147. Other gaming machines may also be connected to WAP device 146 and/or progressive system server 147, as will be described below with reference to FIG. 4A. Via communication path 150, the gaming machine 102 may be connected with additional gaming devices (not shown) that provide other gaming services.

In some embodiments of the present invention, gaming machines and other devices in the gaming establishment depicted in FIG. 3 are connected to a central system and/or other gaming establishments via one or more networks, which may be public or private networks. For example, host server 128 and/or progressive system server 147 may be connected to an outside network. In other embodiments, a bingo server, a switch, or another type of network device may be part of an interface with an outside network. A network device that links a gaming establishment with another gaming establishment and/or a central system will sometimes be referred to herein as a “site controller.”

Figure 4A:
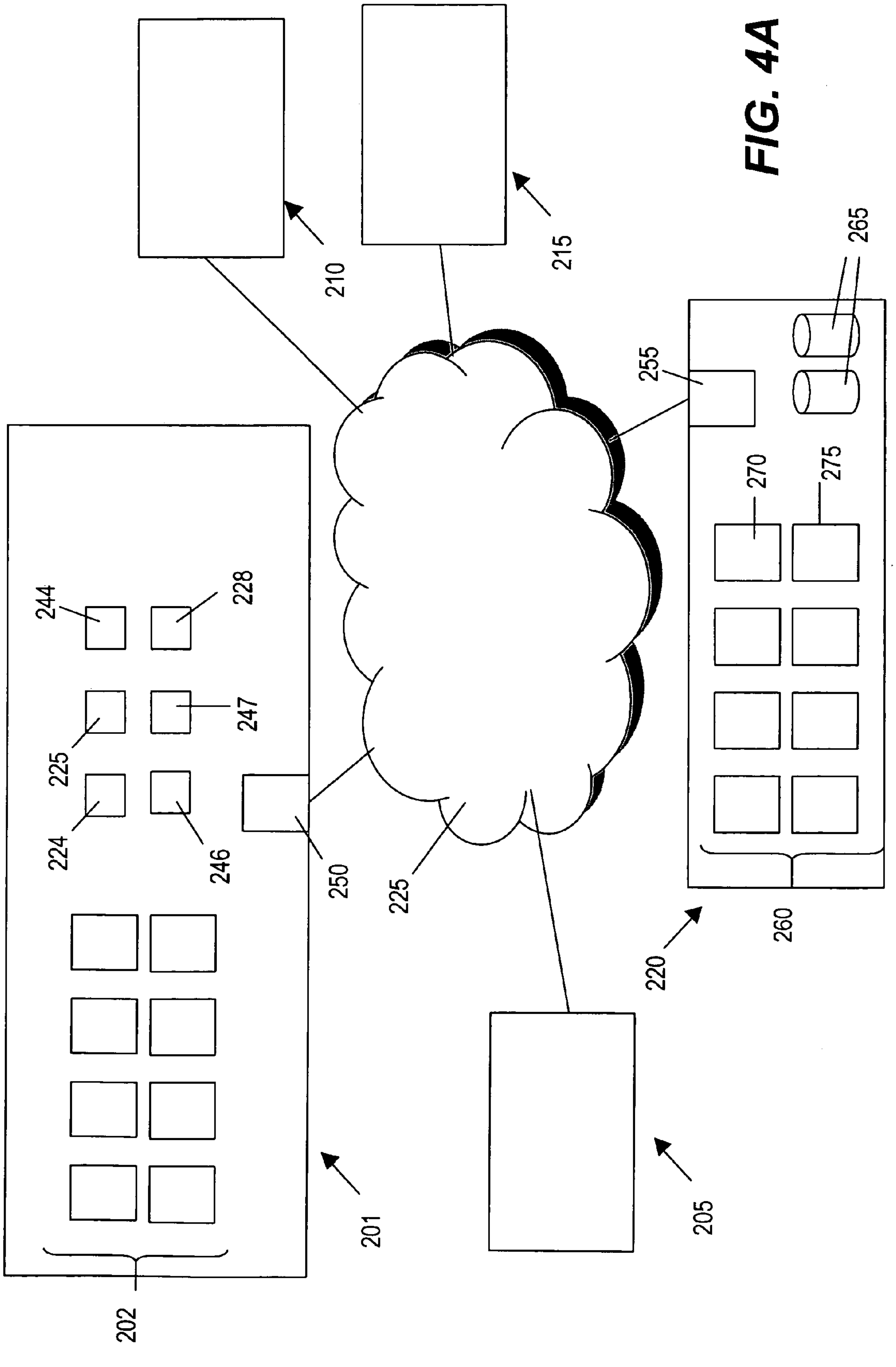
FIG. 4A is a network diagram depicting several gaming establishments configured for communication with a central system via a network that may be used to implement various embodiments of the present invention.

FIG. 4A is a simplified network diagram that illustrates a plurality of gaming establishments connected to a central system operated by or on behalf of a gaming machine provider. In this example, gaming establishments 201, 205, 210 and 215 are connected to central system 220 via network 225. However, those of skill in the art will realize that more or fewer gaming establishments may be in communication with central system 220. In some embodiments, central system 220 is situated at a remote location from the gaming establishments, for example, at an office operated by the gaming machine provider. For example, central system 220 could be located at an IGT office in Reno, Nev., while the gaming establishments may be located in other cities. Moreover, although central system 220 is depicted as having a single location, in alternate embodiments of the invention the devices that constitute central system 220 are in two or more locations.

In this example, network 225 is the Internet. However, it will be understood by those of skill in the art that network 225 could be any one of various other types of networks, such as the PSTN, a satellite network, a wireless network, a metro optical transport, etc. Accordingly, a variety of protocols may be used for communication on network 225, such as Internet Protocol (“IP”), Fibre Channel (“FC”), FC over IP (“FCIP”), Internet SCSI (“iSCSI,” an IP-based standard for linking data storage devices over a network and transferring data by carrying SCSI commands over IP networks) or Dense Wavelength Division Multiplexing (“DWDM,” an optical technology used to increase bandwidth over existing fiber optic backbones).

To transfer data in a secure manner, data transmitted over network 225 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described co-pending U.S. patent application Ser. No. 09/732,650, filed Dec. 7, 2000 by Nguyen et al. and entitled, “Secured Virtual Network in a Gaming Environment,” which is incorporated herein in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (DSS) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, a site controller and central system 220 may have exchanged public encryption keys or public signature keys and other security information that may be used to establish the identity of the sender of a message to central system 220 and to identify messages sent from central system 220. Details of exchanging encryption keys in a secure manner which may be applied to the present invention are described in co-pending U.S. application Ser. No. 09/993,163, by Rowe et al., filed Nov. 16, 2001 and entitled “A Cashless Transaction Clearinghouse,” which are incorporated herein by reference in its entirety and for all purposes.

In FIG. 4A, Gaming establishment 201 is a casino in this example. Gaming establishments 205, 210 and 215 could be any type of gaming establishments that are configured to participate in bonusing and/or progressive jackpots, such as casinos, Internet casinos, etc. Gaming establishments 205, 210 and 215 may have the same owner or different owners. Gaming establishment 201 includes many of the features of gaming establishment 101, including gaming machines 202, DCU 224, translator 225, host server 228, cashless system server 244, WAP device 246 and progressive system server 247. Depending on the embodiment, there may be a single DCU 224 or multiple DCUs. Similarly, there may be one or more translators 225, according to the details of the implementation.

Gaming establishment 201 may include one or more devices that are dedicated to wide area bonusing services. In alternative implementations, wide area bonusing services may be provided by devices that also provide other services, e.g., by WAP device 246 and progressive system server 247. According to such implementations, the network architecture of individual gaming establishments does not need to change in order to provide wide area bonusing services. A modified version of the WAP protocol may be used to implement some such wide area bonusing methods described herein. For example, in some such implementations progressive system server 247 encapsulates and decapsulates an additional header, pertaining to wide area bonusing, on WAP packets. However, the methods of the present invention may be performed by other network devices using other physical or logical networks.

In the embodiment shown in FIG. 4A, each gaming establishment includes a network device that acts as a site controller for interacting with central system 220 to provide bonusing services. The site controller may also be configured to provide other services, such as progressive jackpot services offered by the gaming establishment. In one such implementation, e.g., progressive system server 247 is configured to act as a site controller for providing both bonusing services and progressive jackpot services. As will be discussed in more detail below, many of the functions involved in providing these services can be provided by either the site controller or the central system.

Gateway 250 is a network device with network address translation ("NAT") and firewall capabilities that can support multiple devices of gaming establishment 201 with a single external IP address. Gateway 255 provides NAT and firewall capabilities for central system 220. Internet service providers ("ISPs," which are not shown in FIG. 4A) provide access to network 225 for gaming establishments 201, 205, 210 and 215, and central system 220.

In this example, central system 220 also includes multiple network devices 260 and storage devices 265. The number of network and storage devices shown is purely exemplary. Here, central bonusing server 270 controls a bonusing system for all participating gaming devices and gaming establishments. Similarly, central progressive server 275 controls a progressive jackpot system for all participating gaming devices and gaming establishments. In some implementations, the same network device is used to provide both progressive jackpot and bonusing services. The provision of such services will be described in more detail below.

Central system 220 may provide additional services, including but not limited to cashless services, loyalty program services, auditing services, entertainment content services, communication services, gaming software services, prize services, etc. For example, loyalty program server 280 controls one or more loyalty programs for participating gaming devices and gaming establishments. In some implementations, individual network devices may provide some or all of such services, whereas in other embodiments separate network devices, storage devices, etc., may be dedicated to providing such services.

Cashless services may include services and information related to, e.g., electronic fund transfers. Loyalty program services may include services and information related to the accumulation of player tracking points and the validation of player tracking points for services and prizes. Auditing/accounting services may include services and information relating to player identity, tracking the performance of different gaming activities, etc. However, in some implementations of the present invention, bonusing services and/or progressive jackpot services are de-coupled from player tracking. This feature is advantageous because gaming establishments regard player tracking information as confidential and proprietary. Providing, e.g., bonusing services separately from player tracking services removes impediments to implementing bonusing services to multiple gaming establishments. Therefore, some methods of the present invention facilitate the accumulation of larger bonuses.

Entertainment content services may include information and services related to streaming video feeds and audio feeds to a client device of, for example, sporting events. Communications services may include information and services related to peer-to-peer communications between various devices in central system 220 and outside of central system 220, such as text messaging, voice communications, video feeds, e-mail, paging and locator services.

Gaming software services may include devices configured for downloading software to gaming devices. For instance, a game server may provide gaming software and gaming licenses used to play different games of chance on gaming devices. Further, the game server may be used to provide software upgrades and "bug" fixes for the gaming software. U.S. Pat. No. 6,645,077, which is hereby incorporated by reference, provides examples of such software services.

The prize services may include providing combinations of cash and non-cash prizes for awards on the client devices 110 and methods for redeeming the non-cash prizes. Progressive game services may be related to providing progressive jackpots for games of chance. Details of non-cash prize methods and game services that may be used with the present invention are described in co-pending U.S. Pat. No. 6,857,959, by Nguyen, and entitled "Name Your Prize Game Playing Methodology," which is incorporated herein in its entirety and for all purposes.

Some implementations of the present invention provide an interplay between progressive jackpot services and bonusing services. As noted above, for example, bonusing may advantageously be provided on one or more existing WAP systems. Moreover, the possibility of receiving a bonus may encourage continued play on gaming machines even after a progressive jackpot has been paid out. This allows the progressive jackpot amount to be renewed more quickly than when there is no chance of receiving a bonus.

Figure 4B:
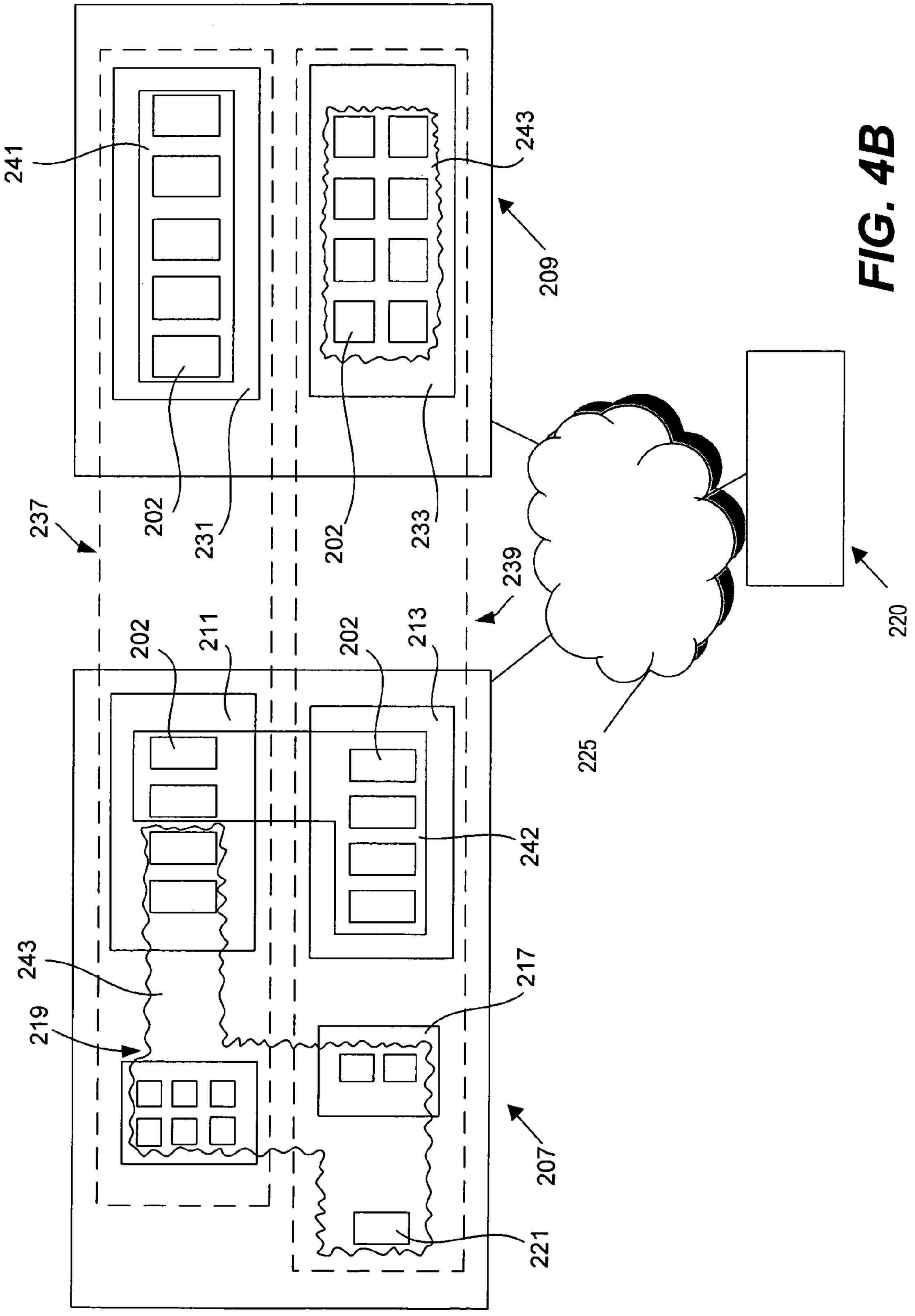
FIG. 4B is a network diagram depicting several gaming establishments configured for communication with a central system via a network that may be used to implement various types of wide area bonusing according to the present invention.

FIG. 4B is a network diagram that illustrates an exemplary relationship between bonusing and progressive jackpot services. Block 207 encompasses gaming machines operated by Entity A and block 209 encompasses gaming machines operated by Entity B. In this example, Entity A operates gaming machines 202 in casinos 211 and 213, as well as gaming machines in grocery 217, airport 219 and convenience store 221. Entity B operates gaming machines 202 in casinos 231 and 233.

In this example, WAP 237 and WAP 239 include gaming machines operated by both Entity A and Entity B. WAP 237 includes gaming machines in airport 219 and casinos 211 and 231. WAP 237 includes gaming machines in convenience store 221, grocery 217 and casinos 213 and 233. WAP 237 and WAP 239 are controlled by central system 220 via network 225 and various other devices, as described elsewhere herein.

The bonusing systems shown in FIG. 4B are implemented by WAP 237 and/or WAP 239. Such implementations are advantageous because they can exploit currently deployed network architecture, and therefore avoid the need to construct a separate bonusing network. However, alternative implementations of the invention are implemented on separate networks.

The bonusing systems illustrated in FIG. 4A do not include all of the gaming machines within the WAP systems on which they are implemented, i.e., the bonusing systems are not coextensive with the WAP systems. Bonusing system 241 is implemented by a single entity at a single site: bonusing system 241 includes only those gaming machines 202 within casino 231, all of which are operated by Entity B. Therefore, there are many other gaming machines within WAP 237 that are not included in bonusing system 241.

Bonusing system 242 is implemented by a single entity at multiple sites. Bonusing system 242 includes all gaming machines 202 within casino 213 and some gaming machines 202 within casino 211, all of which are operated by Entity A. In this example, bonusing system 242 is implemented on more than one WAP system.

Bonusing system 243 is implemented by multiple entities at multiple sites. Bonusing system 243 includes all gaming machines 202 within casino 233, which are operated by Entity B. Bonusing system 243 also includes all gaming machines of grocery 217, airport 219 and convenience store 221 and some gaming machines 202 within casino 211, all of which are operated by Entity A. Like bonusing system 242, bonusing system 243 is implemented on more than one WAP system.

In alternative implementations of the invention, bonusing systems and WAP systems are coextensive, i.e., they include the same gaming machines. Some implementations involve more than two WAP systems and some involve a single WAP system. Similarly, alternative implementations of the invention may include more or fewer bonusing systems.

Figure 5A:
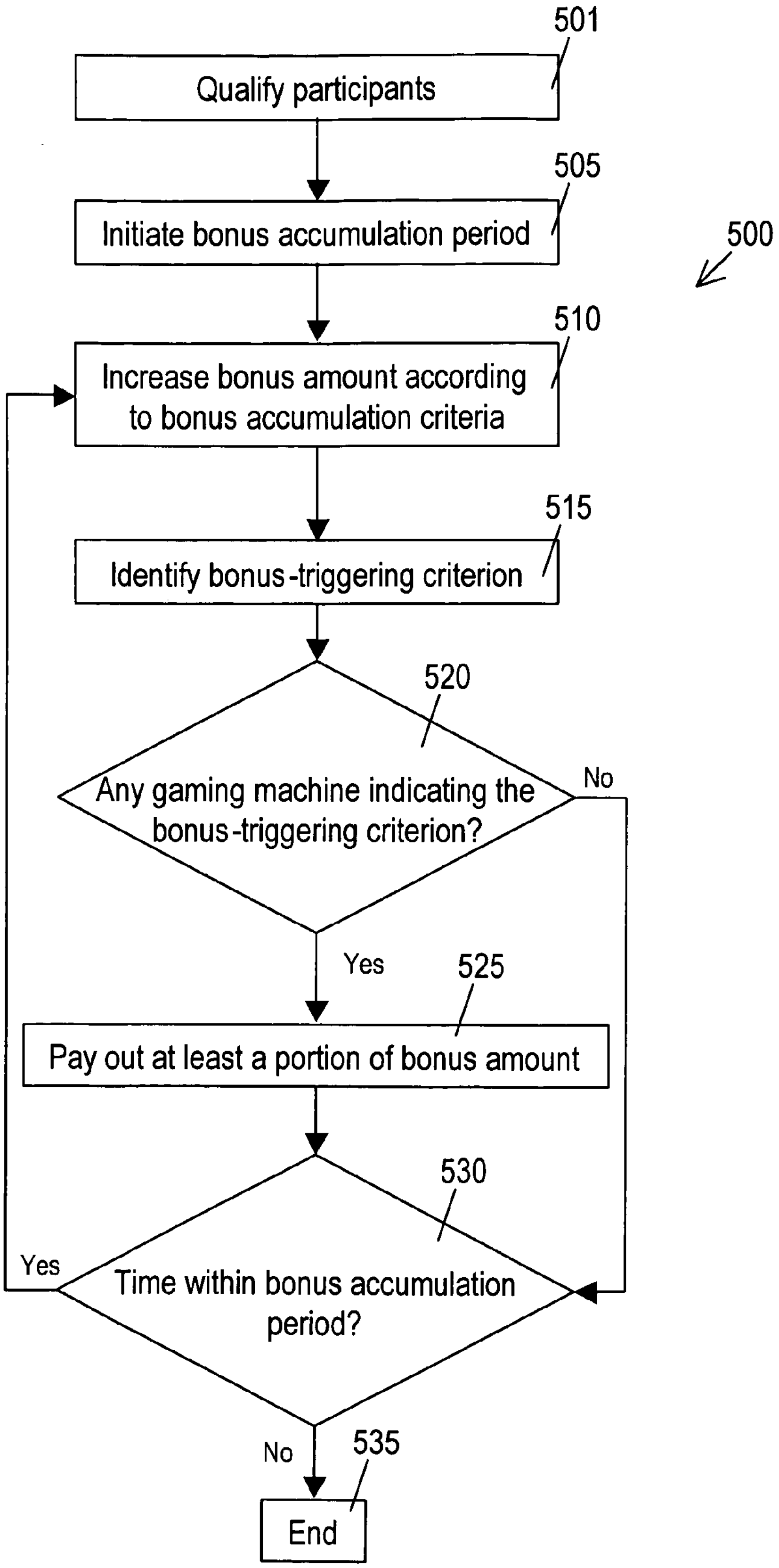
FIG. 5A is a flow chart that provides an overview of some wide area bonusing methods of embodiments of the present invention.

FIG. 5A is a flow chart that illustrates bonusing method 500 according to some aspects of the invention. Bonusing method 500 is performed, at least in part, by one or more devices of central system 220 (e.g., by central bonusing server 270). The steps of method 500 need not be performed in precisely the sequence indicated in FIG. 5A. For example, the first step shown in FIG. 5A is step 501, in which gaming devices and/or casinos are qualified to participate in a bonusing round. However, step 501 is preferably a dynamic and ongoing process that continues during the time that the other steps of method 500 are being performed.

Qualification step 501 is preferably performed, at least in part, by central system 220 and/or a site controller. The qualification process may apply to individual gaming machines, to entire gaming establishments, to banks of gaming machines within a gaming establishment, to types of gaming machines, etc. Qualification criteria may include the type of game(s) available for play on the gaming machine, the size of wagers accepted by the gaming machine, the level of recent gaming activity at the gaming machine, the paytable percentage or payback percentage, the protocol used by the gaming machine, date range, location, device manufacturer, or other criteria.

As noted above, aspects of qualification step 501 may be shared between a site controller and a central controller. For example, the site controller could use a casino's desire to participate and the machines' rates of play to determine which gaming machines the site controller considers to be eligible. The site controller could forward that information to the central controller, which could apply its own criteria (e.g., manufacturer ID, denomination, paytable percentage, jackpot possibilities, etc.) to evaluate gaming machines for eligibility. The central controller preferably does not disclose the all of the conditions for eligibility, especially as they relate to paytable percentage, jackpot probabilities and manufacturer. Keeping these criteria confidential is advantageous because it eliminates the temptation to alter, legally or otherwise, disqualified gaming to skirt requirements that made them ineligible.

Qualification step 501 also involves disqualifying gaming machines, gaming establishments, etc., as conditions change. For example, the level of play at a gaming machine, bank of gaming machines, etc., may decrease below a predetermined threshold, thereby disqualifying one or more gaming machines. In some such implementations, the predetermined threshold is based upon a minimum total of wagers made during a predetermined period.

Step 501 (and other steps of method 500) may actually involve many separate steps. For example, in some implementations step 510 involves an ongoing process of polling the participating gaming establishments, gaming machines, banks of gaming machines, etc., to determine whether participating gaming machines should be qualified or disqualified, to evaluate additional gaming machines, etc.

In some such implementations, a device within each gaming establishment (such as the site controller) polls gaming machines and/or banks of gaming machines to evaluate the qualification status of gaming machines within that gaming establishment. In such implementations, a device within the central system (such as central bonusing server 270) needs only to poll the site controller of each gaming establishment instead of polling each individual gaming machine.

Figure 5B:
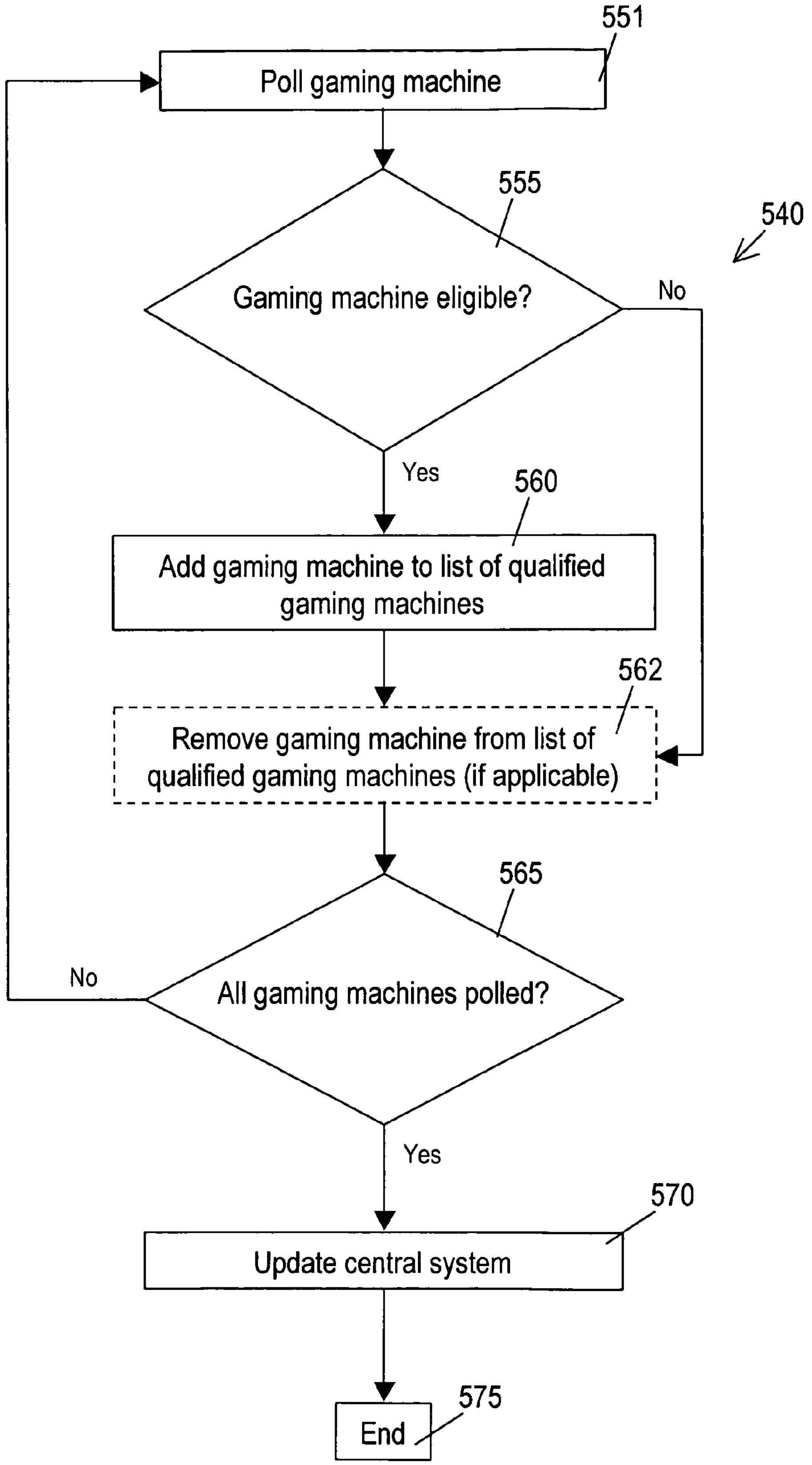
FIG. 5B is a flow chart that provides additional details of a wide area bonusing method according to embodiments of the present invention.

One such implementation is depicted in the flow chart of FIG. 5B. According to method 540, the gaming devices of a particular establishment are polled at predetermined time intervals to determine whether they should be qualified or disqualified from participation in wide area bonusing. In step 551, a site controller polls a gaming machine at the same gaming establishment to obtain data upon which a qualification decision can be made. In step 555, the site controller determines whether, at that time, the gaming device is eligible. If so, the gaming machine is qualified and is added to a compilation (a table, a list, etc.), of qualified gaming machines (step 560). If the gaming device was previously qualified but is no longer eligible, the gaming machine is disqualified and is removed from the list of qualified gaming machines (step 562). If the gaming device was not previously qualified and is not eligible, the list remains unchanged. In some implementations, all gaming machines are indicated on the compilation at all times, instead of being added or removed. The status of each gaming device is revised, if necessary, during the polling process.

The site controller then determines whether all of the gaming machines have been polled during this time interval (step 565). If not, the polling process continues until all gaming machines are polled. If so, the central system is updated (step 570) and the process ends until the next time interval, during which a new polling cycle will be performed if the bonus round is still ongoing. It will be understood by those of skill in the art that other steps of method 500 (and other methods of the present invention) may be performed in a similar fashion, i.e., either solely by the central system or by both the central system and one or more devices in each gaming establishment.

Moreover, in some implementations of the invention, gaming machines send updates when certain activities occur, thereby eliminating some or all of the polling steps described herein. For example, some implementations provide an "interrupt-based" system, wherein gaming machines automatically send messages communicating their status. In such implementations, the gaming machines may send messages regarding their eligibility, e.g., update messages when a factor changes that may affect availability.

Still other implementations provide a system wherein a central controller or a site controller sends requests for eligibility data to networked gaming machines. In some such implementations, the controller sends requests for any eligibility data that have changed since a previous request and the gaming machines respond with the requested information, if any. Such requests may be sent at predetermined time intervals, upon the occurrence of a predetermined event, etc. In some such implementations, the gaming machines respond with a "no changes" message if no eligibility-related conditions have changed since the last poll.

In some implementations, master gaming controller 108 or another element of a gaming machine performs functions to provide, in part, the bonusing services of the present invention. U.S. patent application Ser. No. 09/642,192, filed on Aug. 18, 2000 and entitled, "Gaming Machine Virtual Player Tracking and Related Services," describes some relevant functions of a master gaming controller and is hereby incorporated by reference for all purposes.

During step 501, gaming machines that have been qualified or disqualified for a bonusing round are identified, e.g., by a game serial number. Identifying the gaming machines separately from the player (or without identifying the player) allows for bonuses to be awarded without reference to a player tracking system. As noted elsewhere in this disclosure, de-coupling player tracking features can facilitate the implementation of a wide area bonusing system, primarily because the wide area bonusing system will not require sharing of confidential player tracking information.

A bonus accumulation period begins in step 505. During this period a bonus will accrue, some or all of which may be awarded during a bonusing round. In some implementations, a fraction of each wager made on qualified and participating gaming machines is added to a bonus amount (step 510) during the bonus accumulation period. One or more devices of central system 220 (e.g., central bonusing server 270) keep track of the bonus amount. The criteria for increasing the bonus amount ("bonus accumulation criteria") may vary according to the particular implementation. For example, the fraction of each wager may increase or decrease, depending on the current size of the bonus amount. Alternatively, the fractional amount added to the bonus amount from each wager may be subject to a maximum or minimum. Any other convenient bonus accumulation criteria may be applied, subject to the laws of the appropriate jurisdiction(s).

Information regarding the bonus round may be displayed on or near participating gaming machines in order to generate interest in the bonus round and increase levels of play on the gaming machines. In some such implementations, a sign indicates one or more gaming machines that could participate in a bonusing round, but does not indicate the time or times that a bonus is available.

During the same time that a bonus amount is accruing (and possibly using the same hardware), a progressive jackpot may also be accruing. Some of the gaming machines that are qualified for, and participating in, the bonusing round may also be participating in a progressive jackpot round.

In step 515, at least one bonus-triggering criterion is determined. In order to win a progressive jackpot, a player must be entitled to some level of payout based on a predetermined outcome of the game being played. However, a bonus-triggering criterion does not require achieving a predetermined outcome based on gaming criteria. For example, a bonus-triggering criterion may be a number, preferably a random number, unrelated to a gaming criterion. The number may be generated by central system 220. Alternatively, the number may be made available to central system 220, e.g., by a person, by a random number generator at another location, etc.

In some implementations, there may be more than one bonus-triggering criterion. For example, two or more numbers may need to be matched in order for a bonus to be awarded. The numbers could originate from different sources in order to increase security. In such implementations, participating gaming machines would be instructed to generate the appropriate number of "guesses," as described below. The central system may provide an indication to participating gaming machines regarding a bonus-triggering criterion. For example, the central system may indicate that a winning number will fall within an indicated range of numbers.

In step 520, it is determined whether any gaming machine indicates the bonus-triggering criterion. In order to determine eligibility for receiving a bonus, gaming machines that are participating in a bonusing round may, for example, generate random numbers and transmit them to central system 220 for comparison with the number known by central system 220. In some implementations, a bonus may be awarded if the numbers match or if the numbers are within a certain range of one other. For example, if the number known by central system 220 were a 10-digit number, the least significant 2 digits may not need to match. In other words, if the number known by central system 220 were 1,234,567,890, any number from 1,234,567,800 through 1,234,567,899 could be a winning number in this example.

However, in some implementations, a matching number is a necessary condition but not a sufficient one: a bonus will be awarded only if other conditions also apply. For example, in some implementations a bonus will not be awarded unless at least a predetermined minimum bet was made at the time the numbers were found to match. The minimum amount may apply to an individual gaming machine, a group of gaming machines, an entire gaming establishment, etc. In other implementations, a bonus will only be awarded if a particular game is being played. If all conditions for awarding a bonus are satisfied, at least a portion of the bonus amount is paid out to a gaming machine (step 525).

The central controller (or site controller) preferably ignores random numbers (the "guesses") sent from ineligible gaming machines and/or does not send ineligible gaming machines a "bonus start" message that triggers the sending of such random numbers (or other forms of "guesses"). According to such implementations, it is not necessary for a gaming machine to know if it is eligible or not, thereby making attempts to gain an illegitimate eligibility status more difficult.

In some implementations, the central system may pay out bonuses until the available bonus pool/amount is depleted. In other implementations, bonuses will not be paid out unless the bonus pool is at or above a certain threshold. Some implementations make bonuses available in conjunction with the status of a progressive jackpot. For example, more bonuses may be awarded after a large progressive jackpot award in order to increase game play and accelerate the funding of a new progressive jackpot pool. In some implementations, indications that a bonus is available (e.g., a visual display, an audio announcement, etc.) will be triggered after a progressive jackpot is awarded. Some implementations set aside funds from progressive jackpots to fund bonuses and vice versa.

The scope of bonusing methods that may be applied may be limited by the laws of the applicable jurisdiction(s). For example, bonusing methods may be required to return a reasonable percentage of the money taken in, may need to be based (at least in part) on a random event, etc. Moreover, an audit trail may be legally required, for example of all money taken in and paid out at each gaming machine.

In step 530, it is determined whether the bonus round is still ongoing. If so, the bonus amount will continue to increase. If not, the method ends (step 535).

Figure 6:
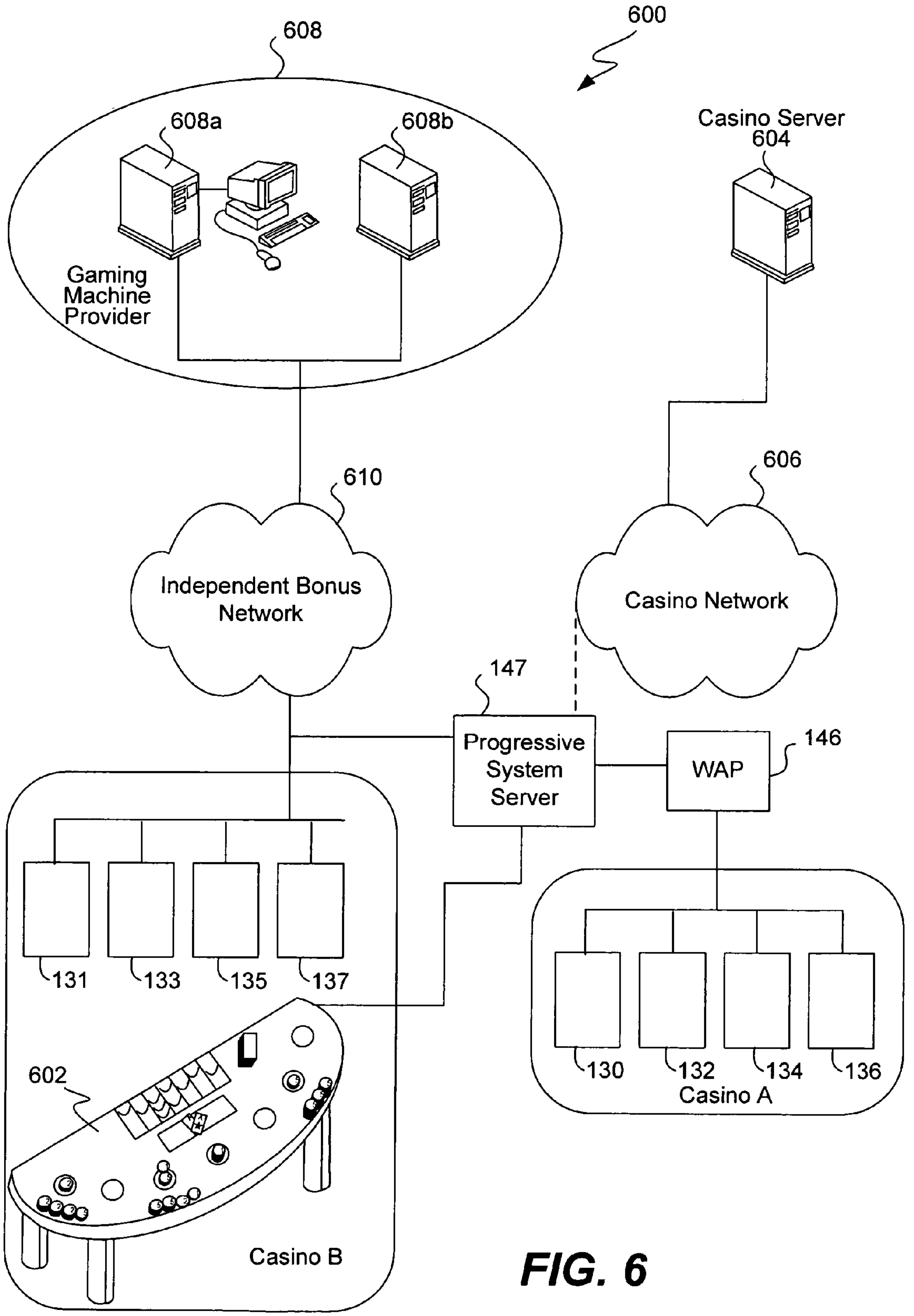
FIG. 6 is a block diagram of a wide area loyalty system 600 with an independent bonus provider, constructed according to one embodiment of the present invention.

FIG. 6 shows a wide area loyalty system 600 with an independent bonus provider, constructed according to one embodiment of the present invention. The system 600 includes a first plurality of gaming machines 130, 132, 134 and 136 situated in a first gaming venue, Casino A. The first plurality of gaming machines are coupled to a progressive system server 147 through a wide area progressive device 146, described above with respect to FIG. 3. A second plurality of gaming machines 131, 133, 135 and 137 are situation in a second gaming venue, Casino B, and also coupled to progressive system server 147. In this implementation, a table game 602 is also coupled to progressive system server 147, as described in Rowe et al., U.S. patent application Ser. No. 11/225,299, filed Sep. 12, 2005, for UNIVERSAL CASINO BONUSING SYSTEMS AND METHODS, which is hereby incorporated by reference. Table game 602 is also situated in Casino B.

In FIG. 6, some or all of the gaming machines in a casino are coupled to a casino loyalty server 604 through a suitable data network 606. The casino loyalty server is operated by or on behalf of the casino. The conventional casino network 606 provides communications paths so that casino server 604 and possibly other data processing apparatus operated by or on behalf of the casino can provide conventional services to players of the gaming machines. These services include accounting services, player tracking services, and bonus awards offered specifically by the casino.

In FIG. 6, a gaming machine provider has its own loyalty system 608 separate and apart from the casino server 604 and casino network 606. In one embodiment, the loyalty system 608 is situated at a remote location with respect to the various casinos. For example, the loyalty system 608 could be situated at one or more IGT facilities outside of the Casinos A and B. In one embodiment, the various gaming machines and table games of the casino are coupled to the loyalty system 608 through an independent bonus network 610. In one embodiment, the independent bonus network 610 is separate and apart from casino network 606. In another embodiment, those skilled in the art will appreciate that independent bonus network 610 and casino network 606 are sub-networks of the same larger data network. The data networks 610 and 606 can be implemented in various ways, including wired and wireless implementations, as will be understood by those skilled in the art.

In FIG. 6, the various loyalty and bonusing services described below are provided as part of loyalty system 608, operated by the gaming machine provider.

In FIG. 6, in one embodiment, the various gaming machines and table games in various gaming environments such as Casinos A and B are coupled to loyalty system 608 through a progressive system server 147. In this way, the bonusing and loyalty services provided by the gaming machine provider can be built on top of the existing progressive jackpot capabilities of progressive system server 147, as described in Saffari et al., U.S. patent application Ser. No. 10/923,333, filed Aug. 20, 2004, for WIDE AREA BONUSING SYSTEMS, which is hereby incorporated by reference. In an alternative embodiment, in which the loyalty and bonusing services of loyalty system 608 are integrated with the services provided by casino loyalty server 604, in a joint loyalty configuration, the progressive system server 147 provides an interface for combining the respective services.

In FIG. 6, the progressive system server 147 provides an existing progressive, e.g. Megajackpot type bonus feature for players of the various games in the casinos.

In FIG. 6, the implementation of loyalty system 608 in combination with independent bonus network 610 is separate and apart from existing servers 604 and networks 606 conventionally offered by the casino. The gaming machine provider loyalty system 608 provides bonusing and promotions over a wide area, including any of the various gaming environments such as casinos, hotels, and airports. This is to be contrasted with loyalty services offered by a casino, that are generally restricted to one or several gaming environments operated by the casino at particular locations. With the loyalty system 608 of the gaming machine provider, all of the various gaming machines at their various locations, in particular progressive games, participate in bonusing and loyalty promotions offered by the gaming machine provider. The gaming machine provider, through loyalty system 608, has direct access to players over such a wide area of locations through independent bonus network 610.

In FIG. 6, in one embodiment, loyalty system 608 includes the separate components of a loyalty server or servers **608*a* and a bonusing server or servers 608*b*. In this way, loyalty system 608 can provide a plurality of loyalty services which can be refined and distributed among the respective servers 608*a* and 608*b*. A first plurality of loyalty services can be performed by loyalty server 608*a*, and a second plurality of loyalty services different from the first plurality can be performed by loyalty server 608*b***.

In FIG. 6, various players can interact directly with the gaming machine provider by virtue of loyalty system 608. Examples of players of particular interest to the gaming machine provider are progressive, e.g. Megajackpot players. For these players, in some embodiments, the loyalty system 608 can be integrated with progressive system server 147 to use some of the capabilities built into progressive system server 147.

In FIG. 6, the gaming machine provider develops its own loyalty following for progressive type games using loyalty system 608. In addition, a benefit of loyalty system 608 is the ability to interact directly with players at various gaming environments, that is, separate and apart from communications between the casino and the players. In this way, the gaming machine provider can gather various types of information directly from the players and the gaming machines. This gaming information, described in great detail below, can be identified and retrieved as desired by the gaming machine provider so the provider can apply criteria to the gaming information and make various determinations as to the players' use of the various gaming machines.

Figure 7:
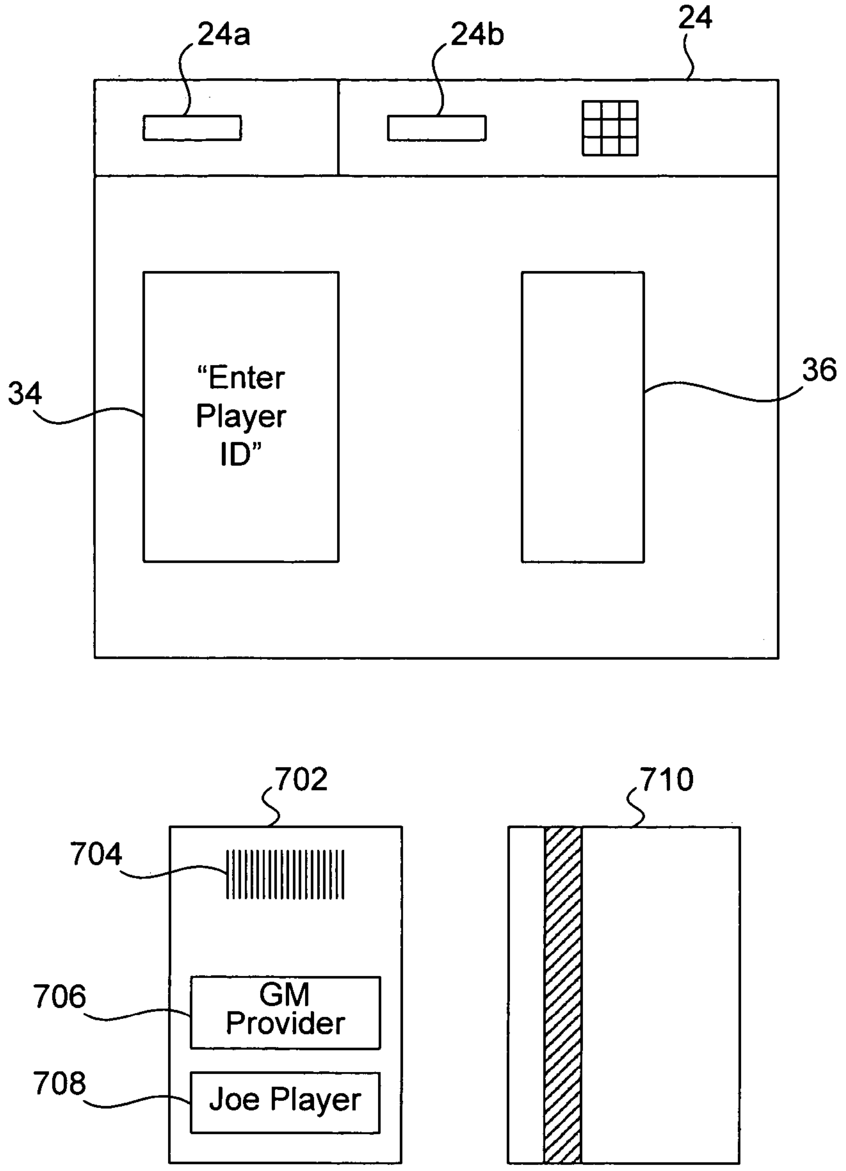
FIG. 7 is a block diagram of gaming machine apparatus including a card reader unit capable of receiving one or more cards input by the player, in accordance with one embodiment of the present invention.

FIG. 7 shows gaming machine apparatus including a card reader unit 24 capable of receiving one or more cards input by the player. In one embodiment, card reader unit 24 includes two interfaces. A first card reader interface **24*a* is a conventional card reader provided by the casino. That is, the card reader interface 24*a*** is capable of receiving a player tracking card issued by the casino. The player tracking card is carried by the player for tracking history of game play and other information associated with that player.

In FIG. 7, card reader unit 24 further includes a second card reader interface **24*b* coupled to the gaming machine provider loyalty system 608 over independent bonus network 610, as shown in FIG. 6. As such, card reader interface 24*b*** provides a separate data gathering resource and communications interface for communicating both player information and gaming machine information associated with the play of games of chance on particular gaming machines to the gaming machine provider.

In FIG. 7, those skilled in the art will appreciate that the configuration of card reader 24 represents one of various implementations for enabling the gaming machine provider to gather and receive information from the player and from the various gaming machines. For instance, in an alternative implementation, the casino interface 24*a* and gaming machine provider interface 24*b* are implemented as separate modules on the gaming machine, for example, in separate card readers. In FIG. 7, in another embodiment, a bill validator 30 is configured to receive the player card, such as ticket 702, magnetic stripped card 710, or a smart card. In yet another embodiment, the gaming machine provider gathers player and gaming machine information directly from the gaming machines following gaming sessions.

In FIG. 7, various cards can be used to read and write player information and gaming machine information. For example, as shown in FIG. 7, in one example, the gaming machine provider issues the player a separate ticket 702 which stores historical game play information for the player, for instance, encoded in a barcode 704. As shown, the ticket 702 further identifies the gaming machine provider 706, and can also include player identification information 708 for the player carrying the ticket 702. In another implementation, the player card is a magnetic striped card 710, as shown in FIG. 7. Other various implementations of the player card are possible, for instance, a smart card. As the player carries the card, e.g. ticket 702, from machine to machine about the gaming environment, gaming machine information as described below and also player identification information can be stored and updated on the card or ticket.

In FIG. 7, in an alternative embodiment, gaming machine information and player tracking information is stored in a storage facility such as any suitable storage medium, e.g., a database or other central storage medium accessible to the gaming machine provider. In this embodiment, when the player approaches the gaming machine 102, a player interface is presented to the player on display 34 or on information panel 36, requesting the player to enter player identification information. By interacting with the player interface 34, the player is identified. The player identification information is communicated to the loyalty system 608 operated by the gaming machine provider, and associated player information and gaming machine information is retrieved from the central storage medium.

In FIG. 7, in some implementations, in which it is desirable to monitor gaming machine information, such gaming machine information can be associated with the player identification information in the central storage medium or a different storage medium dedicated to storing gaming machine information. In display 34 or information panel 36, one of the screens presented to the player as part of the interface can request the entering of a pin number on the screen, to provide some security for accessing the gaming machine information. In this implementation, those skilled in the art will appreciate that a touch screen can be incorporated into the display 34 for the player to interact with the user interface directly.

Figure 8:
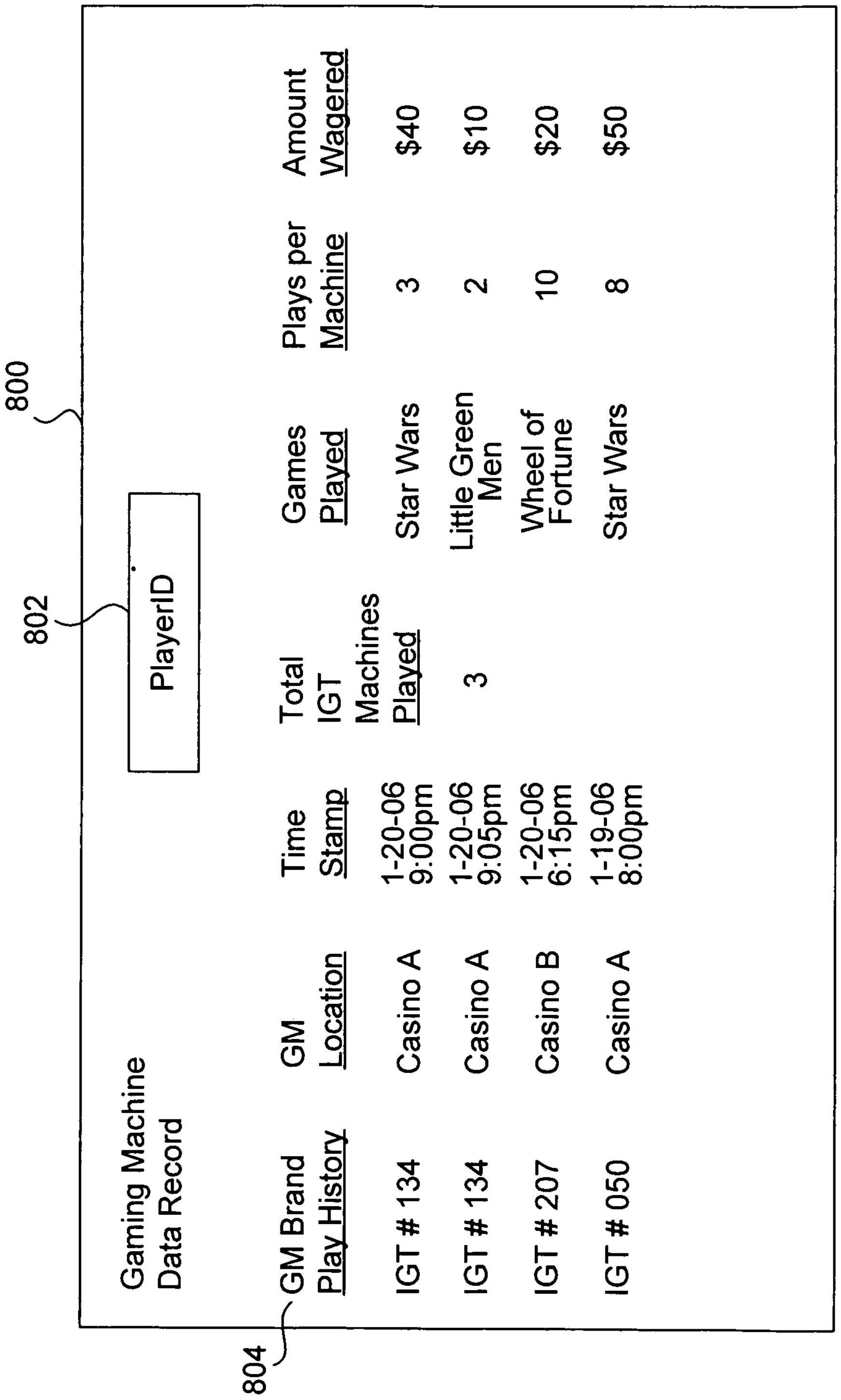
FIG. 8 shows a diagram of a gaming machine data record 800 for use by a gaming machine provider, in accordance with one embodiment of the present invention.

FIG. 8 shows a gaming machine data record 800 for use by the gaming machine provider. The gaming machine data record 800 can be stored at any suitable storage medium accessible by the gaming machine provider. For instance, the data record 800 can be stored in a database or other storage medium accessible to one or more of the servers in loyalty system 608. The gaming machine data record 800 stores gaming machine information gathered over time, indicating usage of the various gaming machines in one or more gaming environments. In one embodiment, gaming machine data records are stored for each individual player. For instance, each time a player inserts his card into a card reader interface, game play history information, including particular gaming machines played in the past, is retrieved for that player. When the player completes game play on the machine, the gaming machine information can be updated at that time and stored in data record 800. In an alternative embodiment, the gaming machine information is stored directly on the card carried by the player. In this embodiment, therefore, the player carries the stored gaming machine information with the player as the player moves about the gaming environment.

In FIG. 8, in one embodiment, the gaming machine data record 800 is constructed as shown. In one field 802, player identification information is stored. Thus, when player ID information is retrieved from the player at the machine, the gaming machine data record 800 can be identified by indexing the retrieved information with player ID field 802. Other fields of gaming machine data record 800 provide gaming machine information of particular interest to the gaming machine provider. Such information includes a play history 804 identifying the particular gaming machines played over a period of time. Preferably, this play history 804 identifies the brand of gaming machines used, for instance, indicating whether the gaming machines provider's machines have been played and how often. In play history 804, preferably the history data stored in that field or fields identifies which machines were most recently used, and which ones were used over the history of the game play monitored for that player.

In FIG. 8, gaming machine data record 800 further includes gaming machine location information identifying the particular gaming environments and locations within those gaming environments, e.g., which casinos and where on the floors of those casinos, the gaming machines identified in play history 804 are located. Further, a time and date field 808 identifies the particular times, dates, and lengths of play of games on the various gaming machines identified in play history 804. A total number of gaming machines played field 810 identifies the total number of gaming machines played by that player. In some implementations, this field 810 indicates the total number of machines played, as well as the total number of machines made by the particular gaming machine provider played. In this way, a percentage of total machines played that are made by the particular gaming machine provider can be calculated.

In FIG. 8 other various gaming machine information of particular interest to the gaming machine provider can be stored. For instance, the particular games played on the various machines in game play history 804 can be identified in field 812. Field 814 identifies the total number of plays per machine and or game. A field 816 identifies the amounts wagered per gaming machine and or game.

In FIG. 8, the gaming machine record 800 enables a gaming machine provider such as IGT to monitor the overall success and popularity of its machines. In some embodiments, master data records are maintained by the gaming provider that provide an aggregation of the information stored in the various gaming machine data records 800 associated with the various players. That is, a master data record includes essentially the same information fields identified in gaming machine data record 800, but stores the aggregation of all the information collected for the various players. Thus, in a master data record, in one implementation, the player ID field 802 is removed, and the remaining fields store the total information received of the players of the system. In another embodiment, master gaming machine data records based on gaming machine data record 800 can be generated according to demographical classifications of the various players. For instance, a master data record 800 can store information as set forth in FIG. 8 for all men between the ages of 18 and 35. Another suitable demographic would be seniors (65 and over). Demographical classifications can be made as desired to monitor the usage of particular gaming machines in particular locations and all the various information set forth in gaming machine data record 800, so that the gaming machine provider can make better business decisions as to the future provision of gaming machines.

Figure 9:
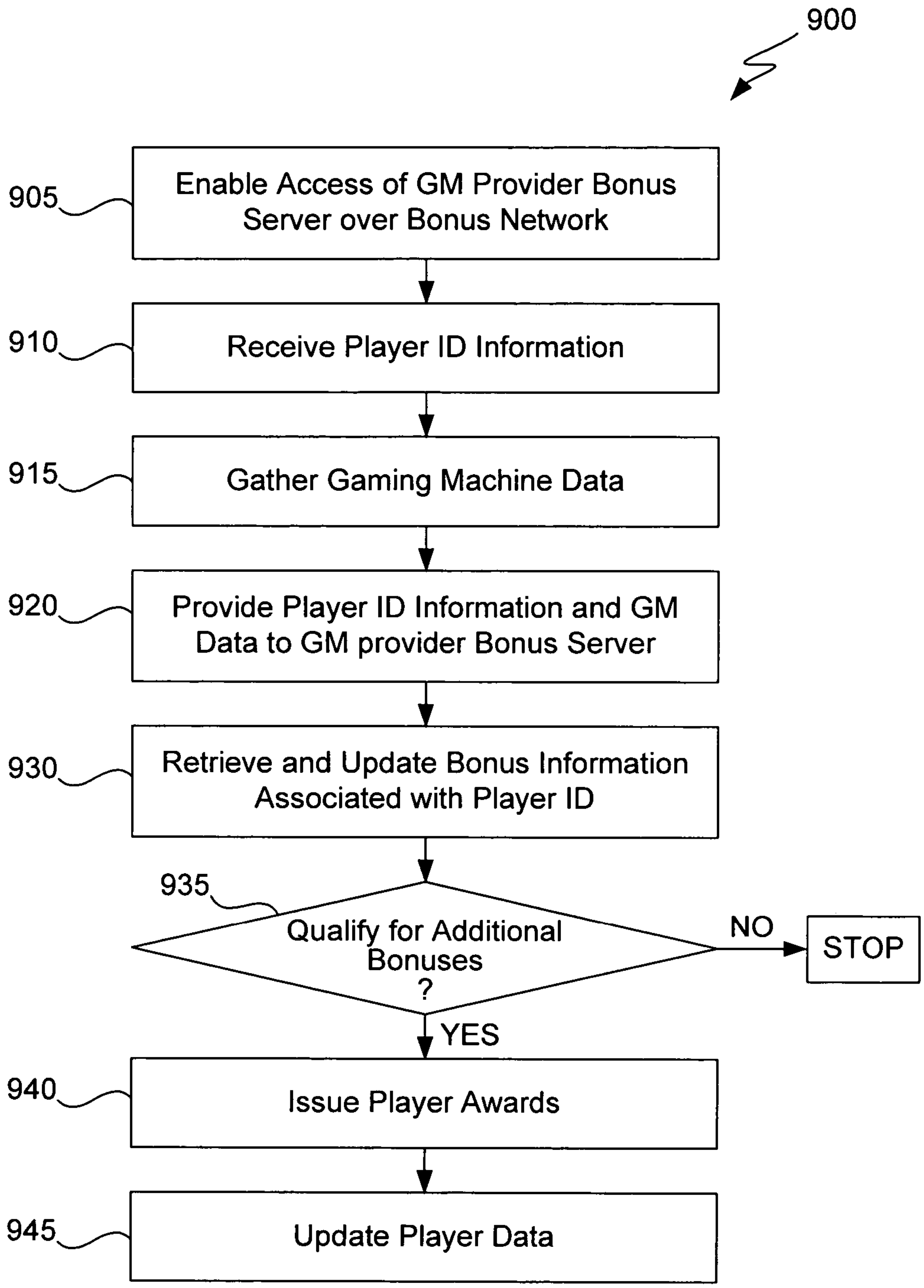
FIG. 9 shows a flow diagram of a method 900 of implementing a wide area loyalty system with an independent bonus provider, performed in accordance with one embodiment of the present invention.

FIG. 9 shows a method of implementing a wide area loyalty system with an independent bonus provider, performed in accordance with one embodiment of the present invention. The method 900 of FIG. 9 begins in step 905, in which access of the gaming machine provider loyalty system 608 is enabled through independent bonus network 610. For example, as shown in FIG. 6, the gaming machines and the various gaming machine environments are capable of communicating with gaming machine provider loyalty system 608 over network 610.

In FIG. 9 in step 910, player identification information is received, for instance, from a card inserted in a card reader interface 24*b* as shown in FIG. 7. The player ID information is communicated to gaming machine provider loyalty system 608 for identification of one or more gaming machine data records, such as gaming machine data record 800 described above with reference to FIG. 8.

In FIG. 9, in step 915, responsive to receiving the player identification information, gaming machine data can be retrieved, for instance, in the form of gaming machine data record 800. As mentioned above, such data records 800 can be retrieved using the player identification information received in step 910. In an alternative implementation, the gaming machine data retrieved in step 915 is stored on a storage medium built into the card such as a memory device, and read from the card at the gaming machine. In step 915, part or all of the gaming machine history information, for instance can be stored on the player's card, and read from the card when inserted in the game machine. For instance, a machine identification number can identify the last machine played by the player.

In FIG. 9, the method 900 proceeds to step 920 in which the player identification information and, in some implementations, certain data stored in gaming machine data record 800, is provided to one or more of the servers 608*a* and 608*b* in loyalty system 608. As mentioned above, such information and related processing by the loyalty servers operated on behalf of the gaming machine provider are separate and apart from any loyalty or award program offered by the casino.

In FIG. 9, in step 930, the loyalty servers process the retrieved player identification information and any selected gaming machine information to issue and update bonus information for the player associated with the player ID.

In FIG. 9, in step 935, the servers in loyalty system 608 apply some criteria to the updated bonus information associated with the player identification information to determine whether the player qualifies for some bonus. Here, the criteria applied to the player's bonus information is often different than any criteria that might be applied by a casino to determine whether the player qualifies for some casino award. For instance, various gaming machine information in gaming machine data record 800 can be checked. That is, the gaming machine provider will often be motivated to provide bonuses and awards to the player when certain information stored within the gaming machine data record 800 associated with the player exceeds some threshold, for instance, the total number of provider's gaming machines played over a period of time. Also, awards can be granted when the total number of plays or amounts wagered on certain machines made by that provider exceed some threshold. Other various criteria can be applied to the gaming machine information associated with that player, including all of the fields shown in data record 800, to determine whether the player qualifies for bonuses.

In FIG. 9, in step 940, player awards are issued by the gaming machine provider. For example, the gaming machine provider can mail the player coupons, certificates or other comps which can be redeemed at a casino or directly on the provider's gaming machines within the casino for additional play. Other comps can be issued by the gaming machine provider, including coupons and discounts at various businesses and services. In step 945, after the player awards are issued, player award history information can be updated and maintained by the gaming machine provider.

In FIG. 9, the method 900 can be implemented in various gaming machine systems configurations, such as the wide area loyalty system 600 of FIG. 6. Through the independent bonus network, the gaming machine provider interacts with the players directly so that special awards, rewards, comps, graphical outputs, and game features can be delivered to the player based on the meeting of certain criteria, as described above.

In FIG. 9, in step 940, player awards issued by the gaming machine provider can include entering the player in progressive jackpots operated by the gaming machine provider. That is, for instance, when the gaming machine information associated with a player satisfies certain criteria, the player can be entered in a progressive jackpot such as a Megajackpot.

Figure 10:
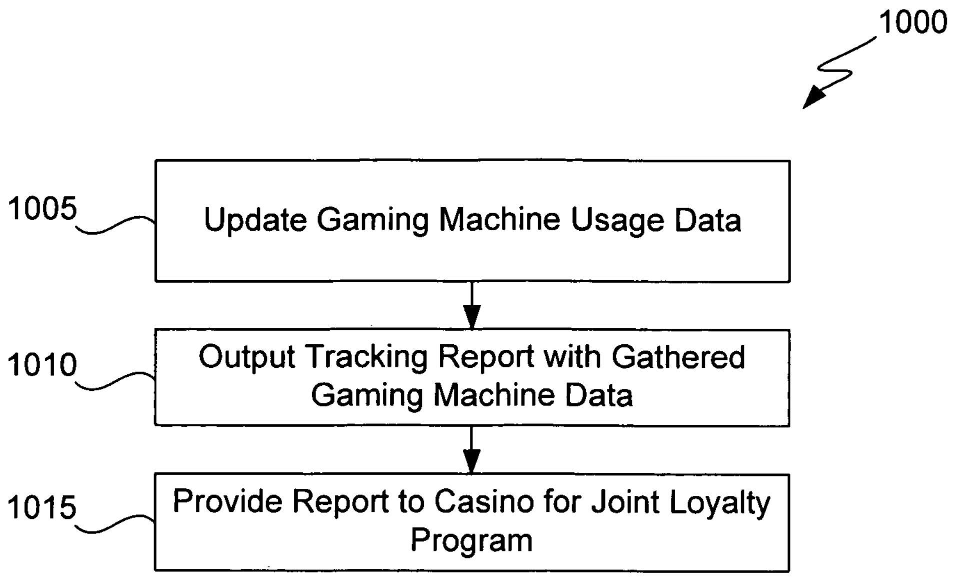
FIG. 10 shows a flow diagram of a method 1000 for generating gaming machine information on behalf of a gaming machine provider, performed in accordance with one embodiment of the present invention.

FIG. 10 shows a method 1000 for generating gaming machine information on behalf of the gaming machine provider, performed in accordance with one embodiment of the present invention. The method 1000 begins in step 1005 in which gaming machine usage data is updated. For instance, following the completion of a game play session on a gaming machine, or the completion of individual plays on the gaming machine that a particular player is playing, the data stored in the various fields of gaming machine data record 800 of FIG. 8 is updated to reflect the most recent gaming machine play information.

In FIG. 10, in step 1010, a report can then be generated by the gaming machine provider at one or more of the loyalty servers 608. This report can provide a summary of the gathered gaming machine information in gaming machine data record 800, for instance, summarizing the popularity i.e. success of various machines. Such a report can then be analyzed by additional processes implemented at the gaming machine provider for analysis to extrapolate information helpful for making future business decisions as to the types of gaming machines to deliver, casinos to deliver them, locations within the casinos providing the greatest success, and other various information.

In step 1015, in some implementations, this report can be delivered to one or more casinos so that a joint loyalty program can be administered. In this implementation, the gaming machine provider such as IGT and one or more casinos cooperate to exchange gaming machine information from gaming machine data record 800 and other player information. In this way, both the gaming machine providers and the casino can communicate the gaming machine information that is helpful to both the gaming machine provider and the casino, as well as the amounts and types of awards being awarded to the various players between one another.

Various techniques can be implemented for establishing, maintaining, and terminating communications sessions between devices coupled to gaming networks to transmit information between the various devices. Data processing devices including gaming machines, servers, and portable devices carried by players can have continuous or intermittent communications sessions with a gaming network, as desired for the particular implementation. For instance, a plurality of transmissions of information between gaming machines and servers as described above can occur while the gaming machine is in constant communication with the server. In an alternative implementation, the gaming machine is not in regular communication with the gaming network and server. The gaming machine and server are configured to establish a communications session with one another over the gaming network when it is desired to pass information between the gaming machine and server, for instance, at the beginning or the end of a gaming session. Thus, gaming machine information, and player tracking and bonus information can be provided for handling during those times when the gaming machine or other device is in communication with the gaming network. Similarly, portable devices carrying gaming data can be configured to be in constant communication with a communications network and/or gaming machine. In another implementation, the portable device has intermittent communications with a data network and/or gaming machine, and is configured to establish a communications session with the data network to pass information, for instance, at the beginning or the end of a gaming session. During times when it is not necessary to pass gaming data or other information, communications between the gaming machine/portable device and other devices over the gaming network can be disabled.

While the invention has been particularly shown and described with reference to specific embodiments thereof, it will be understood by those skilled in the art that changes in the form and details of the disclosed embodiments may be made without departing from the spirit or scope of the invention. For instance, the gaming network may be connected to other devices including other servers or gaming devices over the Internet or through other wired and wireless systems. Moreover, embodiments of the present invention may be employed with a variety of network protocols and architectures. Thus, the examples described herein are not intended to be limiting of the present invention. It is therefore intended that the appended claims will be interpreted to include all variations, equivalents, changes and modifications that fall within the true spirit and scope of the present invention.

What is claimed is:

1. A method for providing wide area bonusing at a loyalty server over a bonus network independent from a gaming establishment network, comprising:

receiving, at the loyalty server situated at a gaming machine provider, via the independent bonus network, player identification information associated with a player directly from one or more gaming machines situated at a gaming establishment and connected with the gaming establishment network, wherein the independent bonus network is separate and apart from the gaming establishment network and is configured to enable direct communication between the gaming machine provider and the gaming machine separate and apart from communication between the gaming establishment and the player, wherein the gaming machine provider is situated at a different location than the gaming establishment, and wherein the gaming machine is configured to establish a first communications session with the independent bonus network at a beginning of a gaming session, establish a second communications session with the independent bonus network at an end of the gaming session, and disable communications with the independent bonus network between the first communications session and the second communications session;

retrieving, at the loyalty server, gaming machine data over the independent bonus network, the gaming machine data associated with the player identification information, the gaming machine data including information particular to the one or more gaming machines;

applying one or more criteria to the retrieved gaming machine data at the loyalty server, the criteria comprising a comparison of the retrieved gaming machine data to a threshold determined by the gaming machine provider; and determining a player bonus according to the application of the one or more criteria to the retrieved gaming machine data.

2. The method of claim 1, wherein the gaming machine data identifies a brand of gaming machines played by the player and a total number of machines played by the player.

3. The method of claim 1, wherein the gaming machine data includes data selected from the group consisting of: total number of machines played, gaming machine play history, games played, number of plays per machine, number of plays per game, amounts wagered per machine, amounts wagered per game, and gaming machine location.

4. The method of claim 1, wherein the player identification information is received at an interface of a gaming machine.

5. The method of claim 4, wherein the interface is associated with the gaming machine provider.

6. The method of claim 4, wherein the interface includes apparatus selected from the group consisting of: a card reader, a ticket reader, and a bill validator.

7. The method of claim 4, wherein the interface includes a user interface generated on a display of the gaming machine.

8. The method of claim 4, wherein the interface includes a wireless communications link.

9. The method of claim 1, wherein the gaming machine data is stored on a memory accessible by the loyalty server.

10. The method of claim 1, wherein the gaming machine data is stored on a portable device carried by the player.

11. The method of claim 10, wherein the portable device is in constant communication with the independent bonus network during a gaming session.

12. The method of claim 10, wherein the portable device is configured to:

establish the first communications session with the independent bonus network at a beginning of a gaming session, establish the second communications session with the independent bonus network at an end of the gaming session, disable communications with the independent bonus network between the first communications session and the second communications session, wherein the portable device provides the gaming data during the first communications session or the second communications session.

13. The method of claim 1, wherein the player bonus includes one or more selected from the group consisting of: an award, a reward, a comp, a promotion, a progressive bonus, a credit, and a graphical output.

14. The method of claim 1, wherein the player bonus is provided by the gaming machine provider.

15. The method of claim 1, further comprising:

generating a report according to the retrieved gaming machine data.

16. The method of claim 15, further comprising:

providing the report to a gaming machine environment operator.

17. A data processing device, comprising:

an interface situated at a gaming machine provider and configured to receive, via an independent bonus network, player identification information associated with a player directly from one or more gaming machines situated at a gaming establishment and connected with a gaming establishment network, wherein the independent bonus network is separate and apart from the gaming establishment network and is configured to enable direct communication between the gaming machine provider and the gaming machine separate and apart from communication between the gaming establishment and the player, and wherein the gaming machine provider is situated at a different location than the gaming establishment, and wherein the interface is configured to establish a first communications session with the independent bonus network at a beginning of a gaming session, establish a second communications session with the independent bonus network at an end of the gaming session, and disable communications with the independent bonus network between the first communications session and the second communications session; and at least one processor coupled to the interface and situated at the gaming machine provider, the processor configured to:

i) retrieve gaming machine data over the independent bonus network, the gaming machine data associated with the player identification information, the gaming machine data including information particular to the one or more gaming machines, ii) apply one or more criteria to the retrieved gaming machine data at the loyalty server, the criteria comprising a comparison of the retrieved gaming machine data to a threshold determined by the gaming machine provider, and iii) determine a player bonus according to the application of the one or more criteria to the retrieved gaming machine data.

18. The data processing device of claim 17, wherein the gaming machine data identifies a brand of gaming machines played by the player and a total number of machines played by the player.

19. The data processing device of claim 17, wherein the gaming machine data includes data selected from the group consisting of: total number of machines played, gaming machine play history, games played, number of plays per machine, number of plays per game, amounts wagered per machine, amounts wagered per game, and gaming machine location.

20. The data processing device of claim 17, wherein the player identification information is received at an interface of a gaming machine.

21. The data processing device of claim 20, wherein the interface is associated with the gaming machine provider.

22. The data processing device of claim 20, wherein the interface includes apparatus selected from the group consisting of: a card reader, a ticket reader, and a bill validator.

23. The data processing device of claim 20, wherein the interface includes a user interface generated on a display of the gaming machine.

24. The data processing device of claim 20, wherein the interface includes a wireless communications link.

25. The data processing device of claim 17, wherein the gaming machine data is stored on a memory accessible by the loyalty server.

26. The data processing device of claim 17, wherein the gaming machine data is stored on a portable device carried by the player.

27. The data processing device of claim 26, wherein the portable device is in constant communication with the independent bonus network during a gaming session.

28. The data processing device of claim 26, wherein the portable device is configured to:

establish the first communications session with the independent bonus network at a beginning of a gaming session, establish the second communications session with the independent bonus network at an end of the gaming session, disable communications with the independent bonus network between the first communications session and the second communications session, wherein the portable device provides the gaming data during the first communications session or the second communications session.

29. The data processing device of claim 17, wherein the player bonus includes one or more selected from the group consisting of: an award, a reward, a comp, a promotion, a progressive bonus, a credit, and a graphical output.

30. The data processing device of claim 17, wherein the player bonus is provided by the gaming machine provider.

31. A gaming system, comprising:

a loyalty server situated at a gaming machine provider, the loyalty server configured to:

receive, via an independent bonus network, player identification information associated with a player directly from one or more gaming machines situated at a gaming establishment and connected with a gaming establishment network, wherein the independent bonus network is separate and apart from the gaming establishment network and is configured to enable direct communication between the gaming machine provider and the gaming machine separate and apart from communication between the gaming establishment and the player, and wherein the gaming machine provider is situated at a different location than the gaming establishment, and wherein the one or more gaming machines are configured to establish a first communications session with the independent bonus network at a beginning of a gaming session, establish a second communications session with the independent bonus network at an end of the gaming session, and disable communications with the independent bonus network between the first communications session and the second communications session;

retrieve gaming machine data over the independent bonus network, the gaming machine data associated with the player identification information, the gaming machine data including information particular to the one or more gaming machines;

apply one or more criteria to the retrieved gaming machine data, the criteria comprising a comparison of the retrieved gaming machine data to a threshold determined by the gaming machine provider; and determine a player bonus according to the application of the one or more second criteria to the retrieved gaming machine data; and a progressive system server coupled with the gaming establishment network and the loyalty server via the independent bonus network, the progressive system server configured to control a progressive jackpot for a plurality of gaming machines at a plurality of gaming establishments.

32. The system of claim 31, wherein the loyalty server is operated by or on behalf of the gaming machine provider.

33. The system of claim 31, wherein the loyalty server comprises a player tracking server.

34. The system of claim 31, wherein the loyalty server is further configured to cause the player bonus to be issued independently of a player tracking system operated by or on behalf of the gaming establishment.

35. The method of claim 1, wherein the player bonus is a player loyalty service or a bonus prize.

36. The data processing device of claim 17, wherein the player bonus is a player loyalty service or a bonus prize.

37. The gaming system of claim 31, wherein the player bonus is a player loyalty service or a bonus prize.

38. The gaming system of claim 31, wherein the progressive system server is situated at the gaming machine provider.

39. The gaming system of claim 31, wherein the player bonus issued by the gaming machine provider is combined with the existing progressive jackpot capabilities of the progressive system server.

40. The gaming system of claim 31, wherein the progressive system server provides an interface for integrating the player bonus issued by the gaming machine provider and a player bonus issued by a gaming establishment.

* * * * *

UNITED STATES PATENT AND TRADEMARK OFFICE

CERTIFICATE OF CORRECTION

PATENT NO. : 8,449,379 B2
APPLICATION NO. : 11/449985
DATED : May 28, 2013
INVENTOR(S) : Richard Rowe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1251 days.

Signed and Sealed this
Sixth Day of January, 2015

Michelle K. Lee
*Deputy Director of the United States Patent and Trademark Office*